US011072260B2

United States Patent
Aktas et al.

(10) Patent No.: US 11,072,260 B2
(45) Date of Patent: Jul. 27, 2021

(54) CARRIAGE ASSEMBLY HAVING RETAINING BRACKETS

(71) Applicant: Ford Global Technologies, LLC, Dearborn, MI (US)

(72) Inventors: Macit Aktas, Windsor (CA); Joshua Gauthier, South Lyon, MI (US); Joseph Michael Kish, Canton, MI (US); Johnathan Andrew Line, Northville, MI (US); Adarsh Gupta, Southgate, MI (US); Robert Clayton Caldwell, Royal Oak, MI (US); Changwei Xie, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 16/548,276

(22) Filed: Aug. 22, 2019

(65) Prior Publication Data

US 2021/0053464 A1  Feb. 25, 2021

(51) Int. Cl.
*B60N 2/005* (2006.01)
*B60N 2/07* (2006.01)

(52) U.S. Cl.
CPC .......... *B60N 2/0722* (2013.01); *B60N 2/005* (2013.01); *B60N 2/073* (2013.01); *B60N 2/0715* (2013.01)

(58) Field of Classification Search
CPC .. B60N 2/0715; B60N 2/0705; B60N 2/0722; B60N 2/073
USPC ................ 296/65.13, 65.14, 65.15
See application file for complete search history.

(56) References Cited

U.S. PATENT DOCUMENTS

| | | | |
|---|---|---|---|
| 4,262,963 A | 4/1981 | Bauer et al. | |
| 5,921,606 A * | 7/1999 | Moradell | B60N 2/01583 296/65.03 |
| 5,938,164 A | 8/1999 | Kargol et al. | |
| 6,629,721 B1 | 10/2003 | Macey | |
| 7,188,805 B2 | 3/2007 | Henley et al. | |
| 7,429,190 B2 | 9/2008 | Hueber | |
| 7,712,829 B2 * | 5/2010 | Park | B60N 2/0881 297/234 |
| 8,245,994 B2 | 8/2012 | Yamada et al. | |
| 8,382,057 B2 | 2/2013 | Napau et al. | |
| 9,376,044 B2 | 6/2016 | Fujita et al. | |
| 2007/0215778 A1 * | 9/2007 | Kadlec | B60N 2/0722 248/429 |
| 2011/0062285 A1 | 3/2011 | Herzog et al. | |
| 2013/0200244 A1 | 8/2013 | Werner et al. | |
| 2021/0053467 A1 * | 2/2021 | Aktas | B60N 2/43 |
| 2021/0053468 A1 * | 2/2021 | Aktas | B60N 2/067 |

(Continued)

FOREIGN PATENT DOCUMENTS

JP WO2013161620 A1 12/2015

*Primary Examiner* — Jason S Morrow
(74) *Attorney, Agent, or Firm* — David Coppiellie; Price Heneveld LLP

(57) ABSTRACT

A rail assembly includes a track assembly with a retaining lip and a carriage assembly that is received within the track assembly. The carriage assembly includes a body portion, an exterior surface of the body portion, and a retaining bracket fastened to the exterior surface. The retaining bracket extends outwardly from the point at which the retaining bracket is fastened to the exterior surface. The retaining bracket defines a notch that receives the retaining lip of the track assembly.

20 Claims, 36 Drawing Sheets

(56) References Cited

U.S. PATENT DOCUMENTS

2021/0078510 A1\* 3/2021 Line ........................ B60N 2/005
2021/0094444 A1\* 4/2021 Line ........................ B60R 16/03

\* cited by examiner

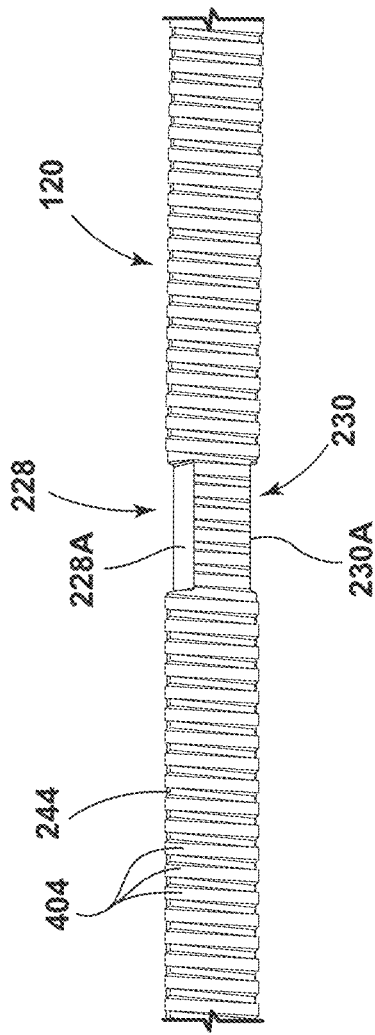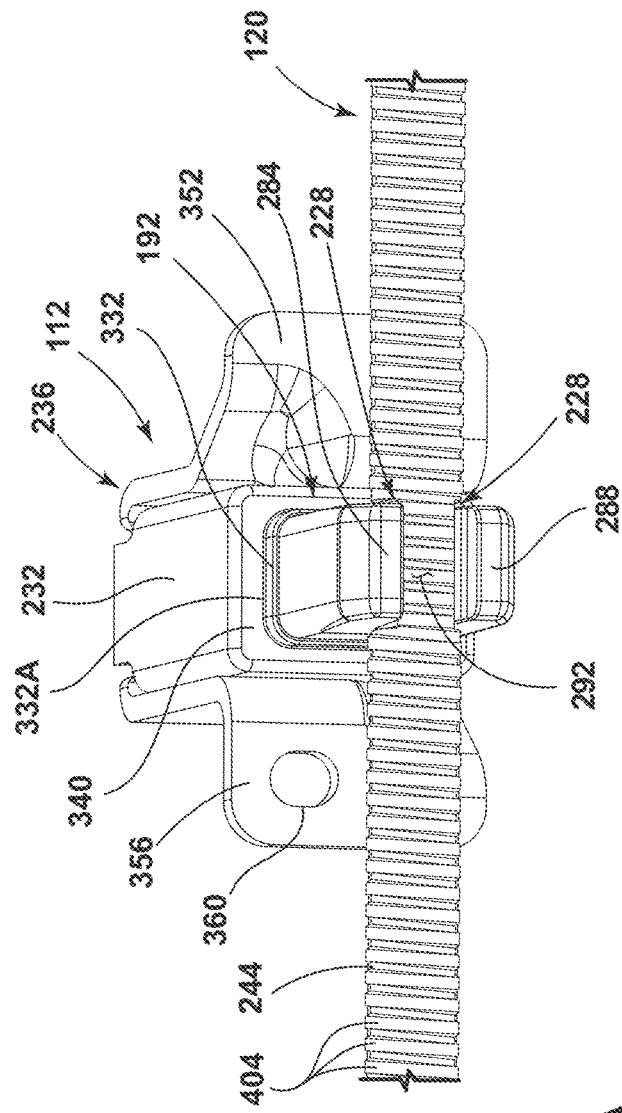

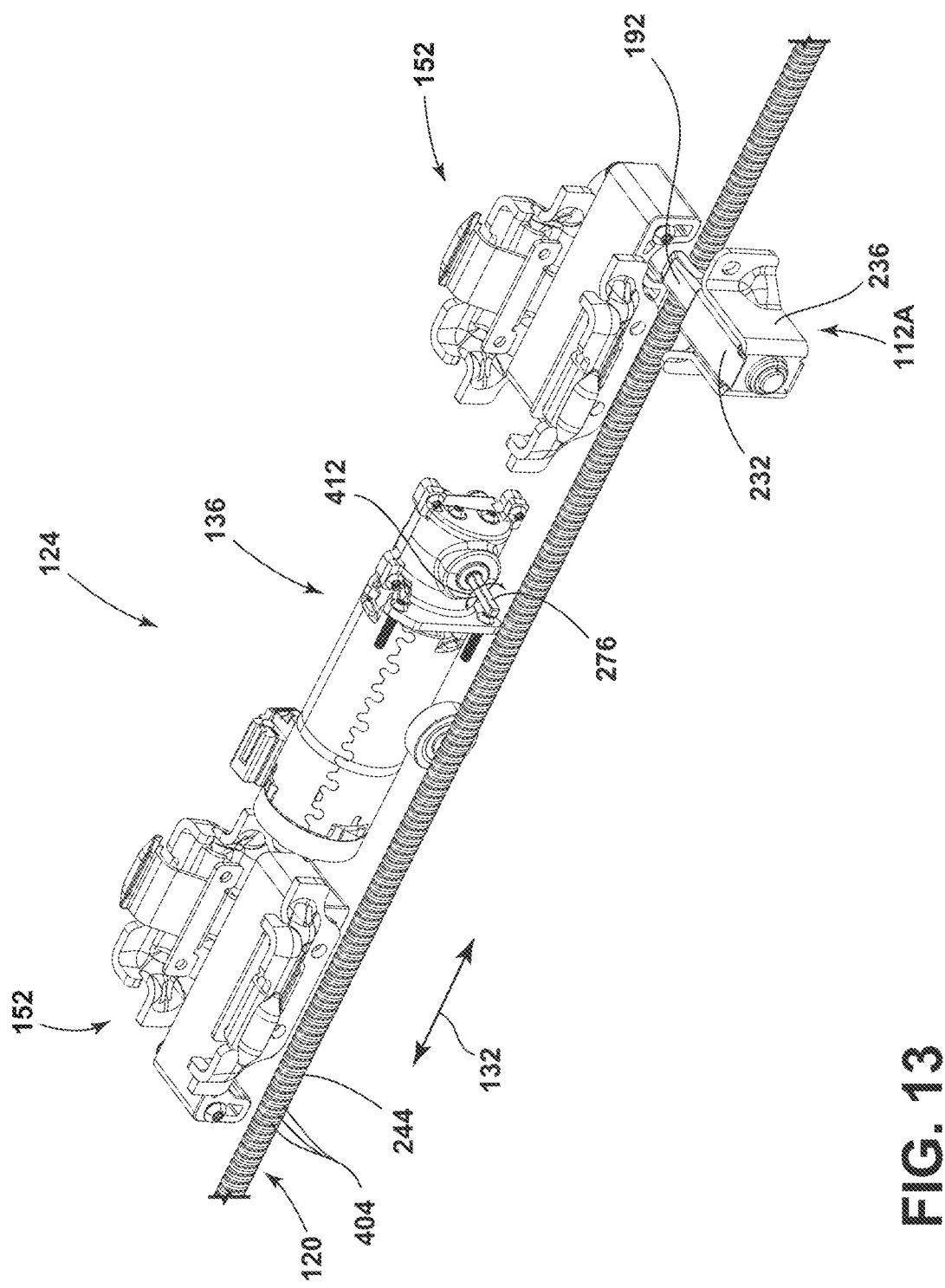

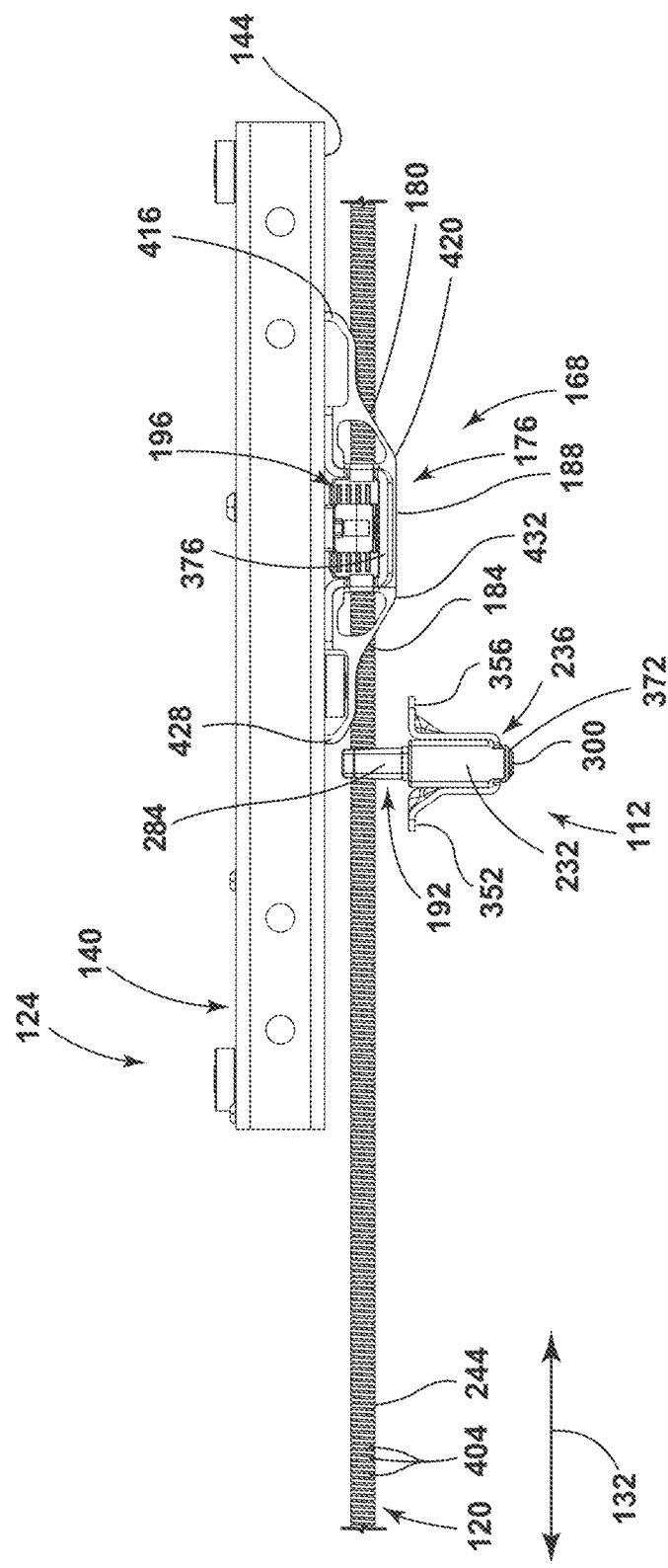

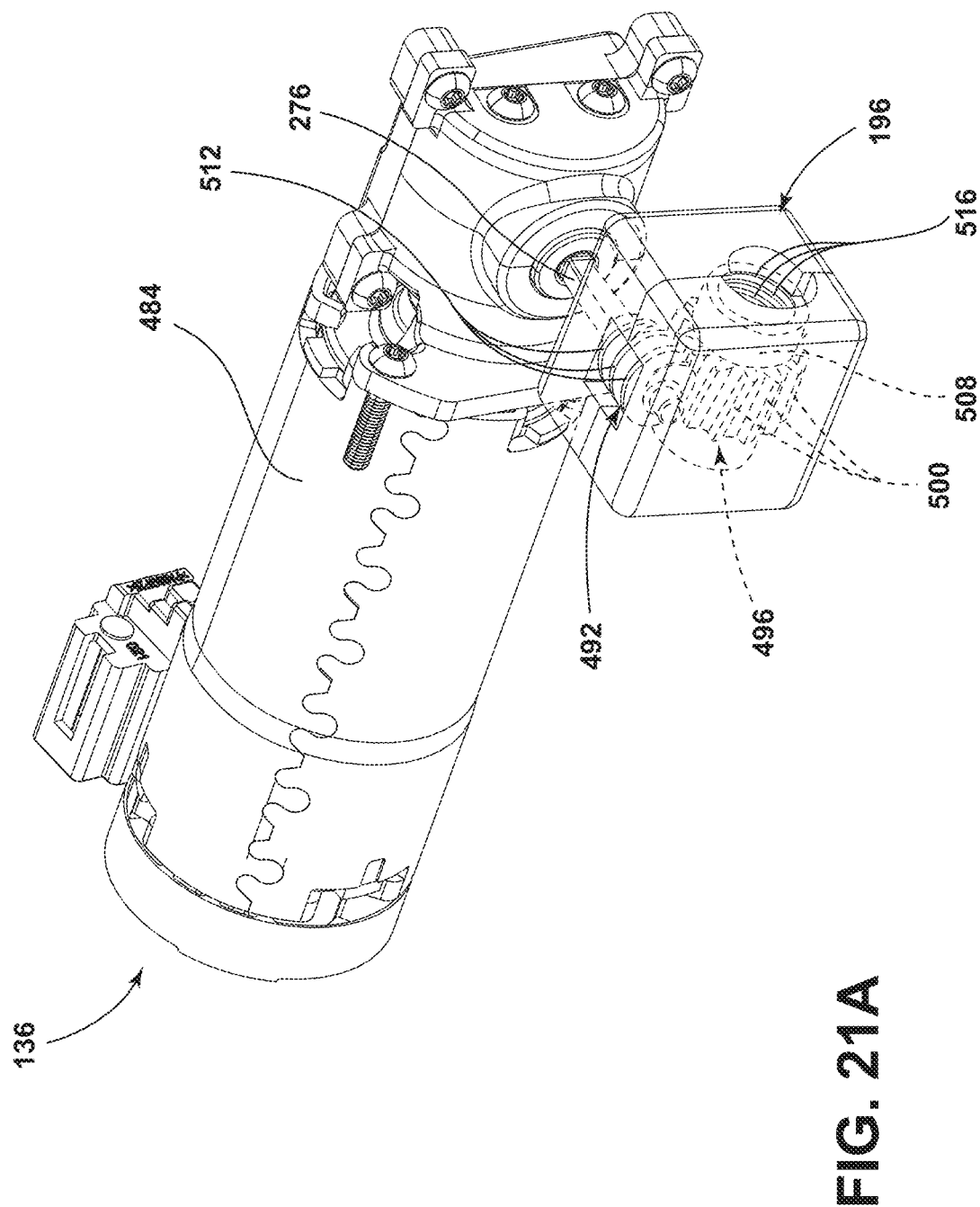

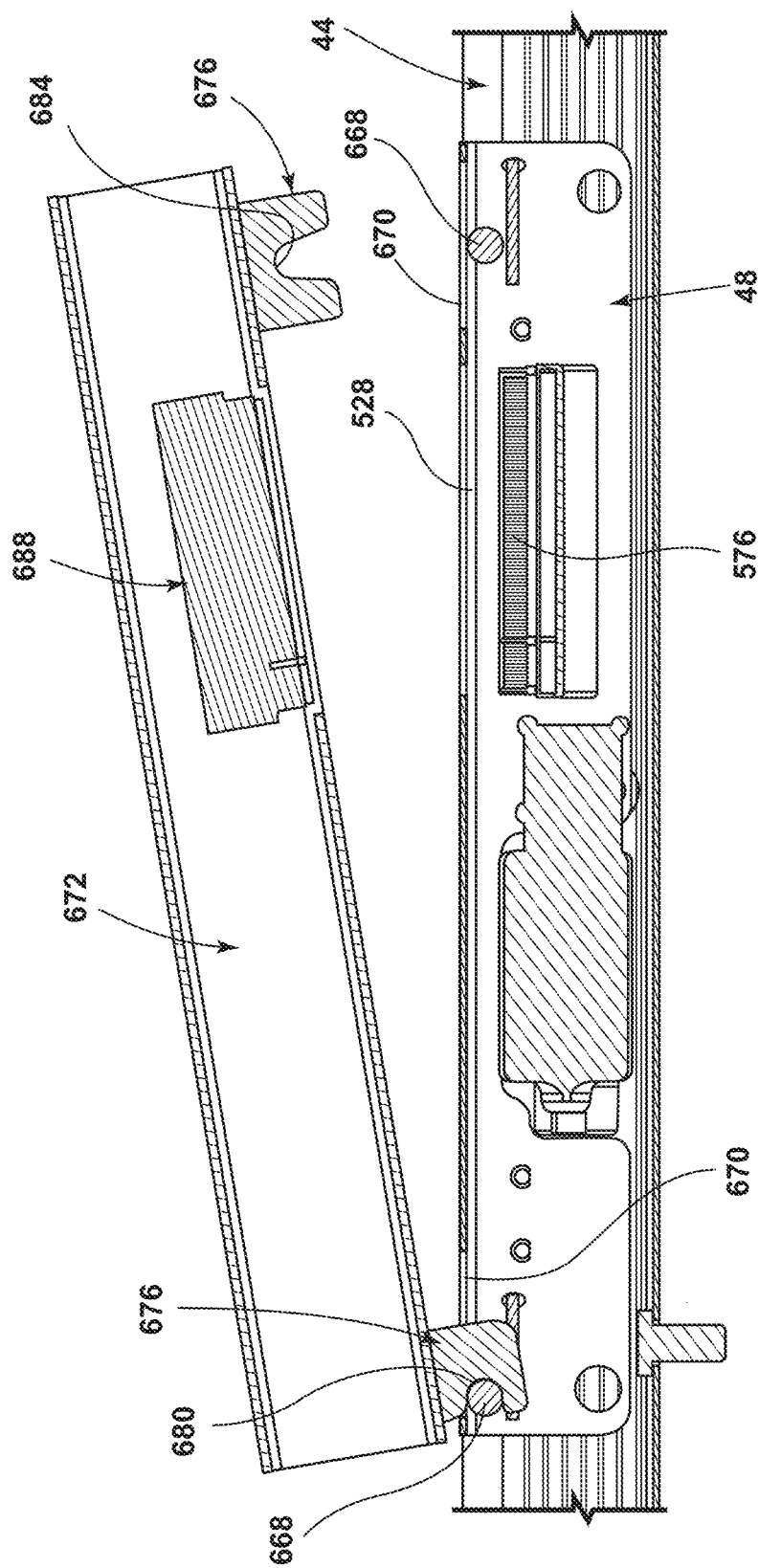

CARRIAGE ASSEMBLY HAVING RETAINING BRACKETS

FIELD OF THE DISCLOSURE

The present disclosure generally relates to a carriage assembly. More specifically, the present disclosure relates to a carriage assembly having retaining brackets.

BACKGROUND OF THE INVENTION

Rail assemblies have been utilized for movably mounting seating assemblies to vehicles. However, additional solutions are needed that provide enhancements to the operation of the rail assembly.

SUMMARY OF THE INVENTION

According to a first aspect of the present disclosure, a rail assembly includes a track assembly with a retaining lip and a carriage assembly that is received within the track assembly. The carriage assembly includes a body portion, an exterior surface of the body portion, and a retaining bracket fastened to the exterior surface. The retaining bracket extends outwardly from the point at which the retaining bracket is fastened to the exterior surface. The retaining bracket defines a notch that receives the retaining lip of the track assembly.

Embodiments of the first aspect of the present disclosure can include any one or a combination of the following features:

- the retaining bracket includes a mounting flange that is fastened to the exterior surface of the body portion of the carriage assembly;
- the mounting flange of the retaining bracket is parallel to the exterior surface of the body portion of the carriage assembly, wherein the mounting flange directly abuts the exterior surface of the body portion of the carriage assembly;
- the retaining bracket further includes a body portion that extends outwardly from the mounting flange and the exterior surface of the body portion of the carriage assembly;
- the retaining bracket further includes retention arms that extend inwardly toward the mounting flange from the body portion of the retaining bracket;
- the retention arms are positioned at opposing ends of the body portion of the retaining bracket;
- the inward extension of the retention arms relative to the body portion of the retaining bracket defines the notch that receives the retaining lip of the track assembly;
- the retention lip of the track assembly is positioned along a horizontal plane of the track assembly;
- the body portion of the retaining bracket is laterally offset from a terminal end of the retention lip in the horizontal plane;
- the retention arms of the retaining bracket extend over an upper surface of the retention lip in a vertical plane;
- the extension of the retention arms over the upper surface of the retention lip in the vertical plane occurs solely at the opposing ends of the retaining bracket that are provided with the retention arms;
- the outward extension of the retaining bracket from the exterior surface of the carriage assembly defines a cavity between the retaining bracket and the exterior surface;
- a guide assembly received within the cavity between the retaining bracket and the exterior surface, wherein the guide assembly is mounted to the exterior surface of the carriage assembly;
- the guide assembly includes a mounting bracket, a resilient portion extending from the mounting bracket, and a guide member positioned at an end of the resilient portion that is opposite the mounting bracket; and
- the retaining bracket further includes a recess defined by an upper surface of the body portion of the retaining bracket, wherein the resilient portion of the guide assembly extends over the recess to position the guide member outward of an exterior surface of the retaining bracket.

According to a second aspect of the present disclosure, a rail assembly includes a track assembly with a retaining lip and a carriage assembly that is received within the track assembly. The carriage assembly includes a body portion, an exterior surface of the body portion, and a retaining bracket. The retaining bracket includes a first end, a second end, a mounting flange that is fastened to the exterior surface of the body portion of the carriage assembly, a body portion that extends outwardly from the mounting flange and the exterior surface of the body portion of the carriage assembly, and retention arms that extend inwardly toward the mounting flange from the body portion of the retaining bracket at the first end and the second end of the retaining bracket. The inward extension of the retention arms relative to the body portion of the retaining bracket defines a notch that receives the retaining lip of the track assembly.

Embodiments of the second aspect of the present disclosure can include any one or a combination of the following features:

- the retention lip of the track assembly is positioned along a horizontal plane of the track assembly, wherein the body portion of the retaining bracket is laterally offset from a terminal end of the retention lip in the horizontal plane;
- the retention arms of the retaining bracket extend over an upper surface of the retention lip in a vertical plane, wherein the extension of the retention arms over the upper surface of the retention lip in the vertical plane occurs solely at the first and second ends of the retaining bracket that are provided with the retention arms;
- the outward extension of the body portion of the retaining bracket from the mounting flange of the retaining bracket defines a cavity between the retaining bracket and the exterior surface of the carriage assembly to which the retaining bracket is fastened, wherein a guide assembly is received within the cavity between the retaining bracket and the exterior surface, and wherein the guide assembly is mounted to the exterior surface of the carriage assembly; and
- the retaining bracket further includes a recess defined by an upper surface of the body portion of the retaining bracket, and wherein the guide assembly includes a mounting bracket, a resilient portion extending from the mounting bracket, wherein the resilient portion extends over the recess of the retaining bracket to position the guide member outward of an exterior surface of the retaining bracket, and a guide member positioned at an end of the resilient portion that is opposite the mounting bracket.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9A is a side perspective view of an elongate shaft with an engagement feature of a
support assembly engaging upper and lower notches of the elongate shaft;

FIG. 9B is a side perspective view of the elongate shaft having the upper and lower notches;

FIG. 13 is a top perceptive view of the coupling assembly with the gear box removed therefrom to reveal a drive shaft of an actuator;

FIG. 18B is a top view of the support assembly and the carriage assembly of FIG. 18A;

FIG. 21A is a side perspective view of an actuator, illustrating an engagement between the actuator and a gear box that engages with the elongate shaft, according to one example;

FIG. 27 is a cross-sectional view of the rail assembly and a component mounting assembly, taken at line XXVII-XXVII of FIG. 1, illustrating an initial coupling of the component mounting assembly to the carriage assembly, according to one example;

DETAILED DESCRIPTION OF THE PREFERRED EMBODIMENTS

Figure 1:
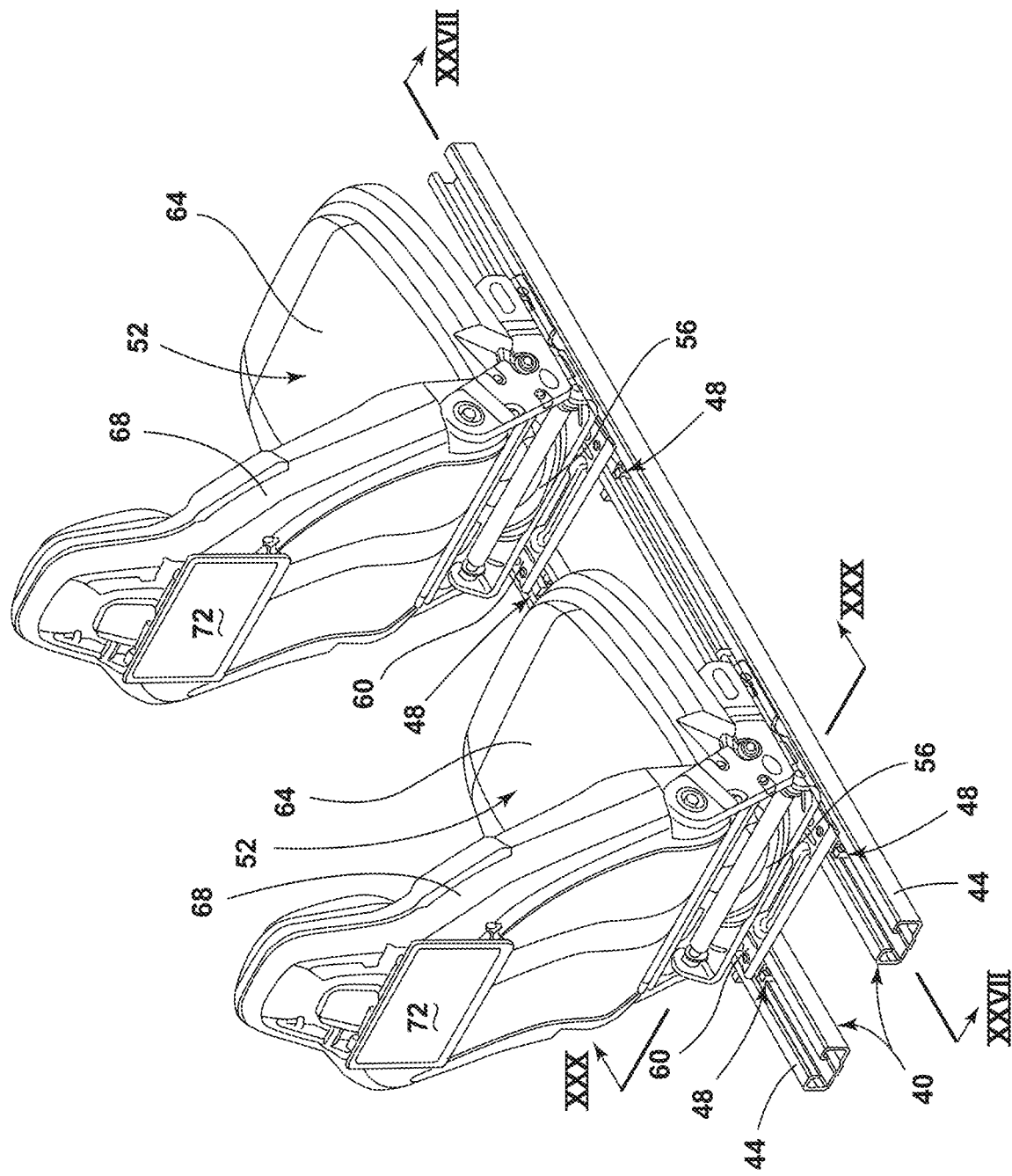
FIG. 1 is a rear perspective view of rail assemblies with corresponding rail-mounted components coupled thereto, illustrating the rail-mounted components in a deployed position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a rail assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about" It will be further understood that the end-points of each of the ranges are significant both in relation to the other end-point, and independently of the other end-point.

The terms "substantial," "substantially," and variations thereof as used herein are intended to note that a described feature is equal or approximately equal to a. value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
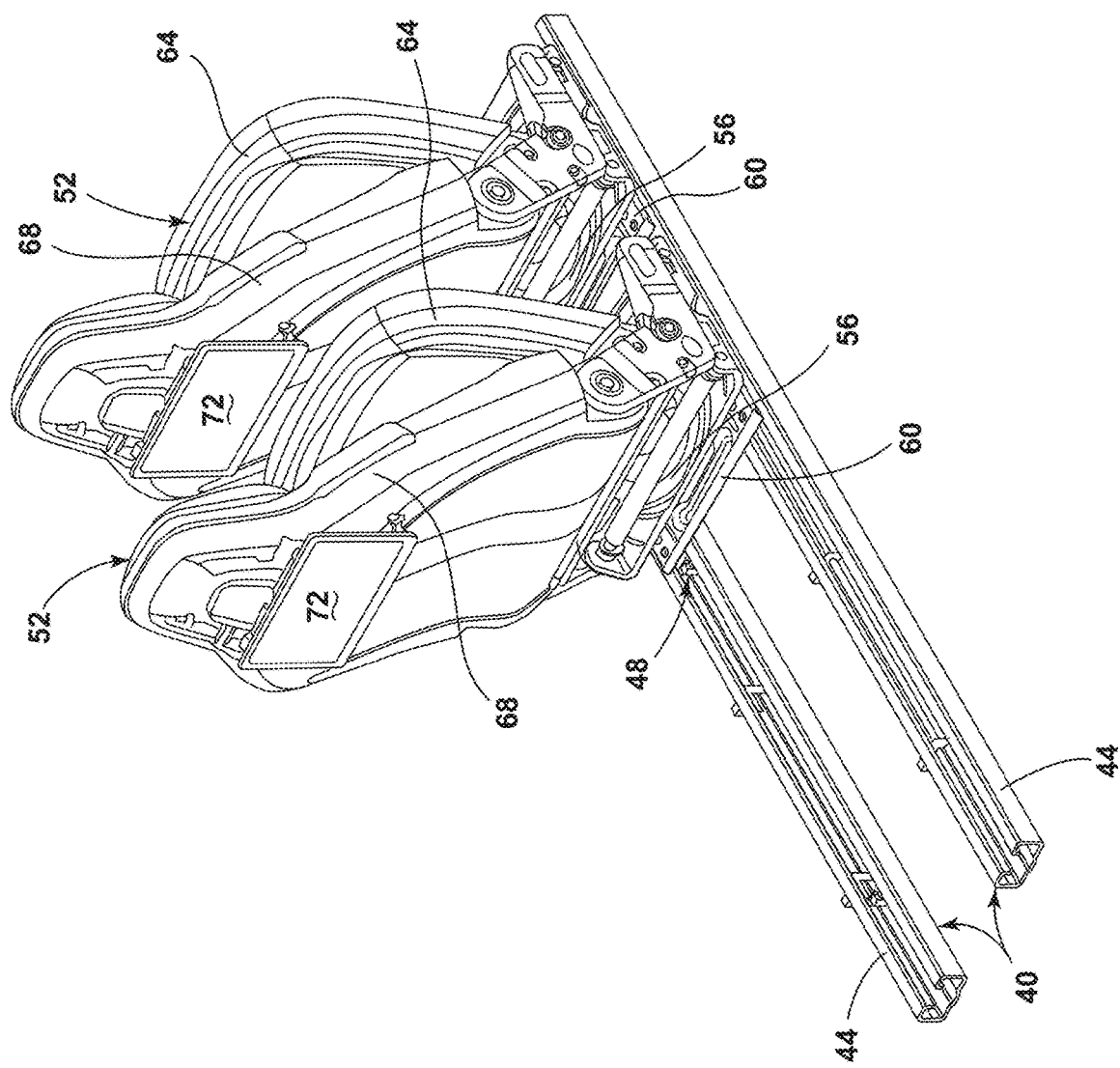
FIG. 2 is a rear perspective view of the rail assemblies with the corresponding rail-mounted components coupled thereto, illustrating the rail-mounted components in a stowed-and-stacked position.

Referring to FIGS. 1 and 2, a rail assembly 40 can include a track assembly 44 and a carriage assembly 48. A first rail assembly 40 and a second rail assembly 40 can be arranged alongside one another to define a pair of the rail assemblies 40. The first and second rail assemblies 40 can be referred to as left and right or inboard and outboard rail assemblies 40. The track assemblies 44 of the rail assemblies 40 can be coupled to a vehicle in various examples. For example, the track assemblies 44 can be mounted to a floor of a cabin of a vehicle. The carriage assemblies 48 can be received within the track assemblies 44 such that the carriage assemblies are movable relative to the track assemblies 44. In various examples, the carriage assemblies 48 in adjacent track assemblies 44 can be aligned with one another in a lateral or horizontal plane to receive one or more rail-mounted components. in the depicted examples of FIGS. 1 and 2, the rail-mounted components are seating assemblies 52. However, the present disclosure is not so limited. Rather, the rail-mounted components may be, but are not limited to, seating assemblies 52, consoles, storage units, storage compartments, desks, and/or tables. In the depicted examples, the seating assemblies 52 can be provided with a swivel assembly 56 that enables rotation of the seating assembly 52 about a vertical axis relative to a component mounting bracket 60. The component mounting bracket 60 can be directly mounted to one or more of the carriage assemblies 48. The seating assemblies 52 can be stadium-style seating assemblies. That is, a seat 64 of the seating assembly 52 can be pivotably coupled to a seatback 68 of the seating assembly 52 such that the seat 64 is movable between a generally horizontal position that can receive an occupant (FIG. 1) to a generally vertical position that reduces a. footprint of the seating assembly 52 (FIG. 2). Accordingly, the seating assembly 52 may be placed in a stowed position that results in the seating assembly 52 occupying less square footage in a horizontal plane than when the seating assembly 52 is in a deployed position. Seating assemblies 52 that are in-line or tandem with one another may then be actuated along the track assembly 44 to a stowed-and-stacked position (FIG. 2) that can be utilized to increase a cargo capacity of the vehicle when seating capacity is less of a priority. The seating assemblies 52, or other rail-mounted components, can be provided with a user interface 72. The user interface 72 may be used for, but is not limited to, providing a viewing screen for media, conveying and receiving information/requests, adjusting comfort settings, adjusting media setting, adjusting a position of the seating assembly 52 to which the user interface 72 is directly attached, adjusting a position of the seating assembly 52 immediately rearward of the seating assembly 52 to which the user interface 72 is directly attached, and/or combinations thereof.

Figure 3:
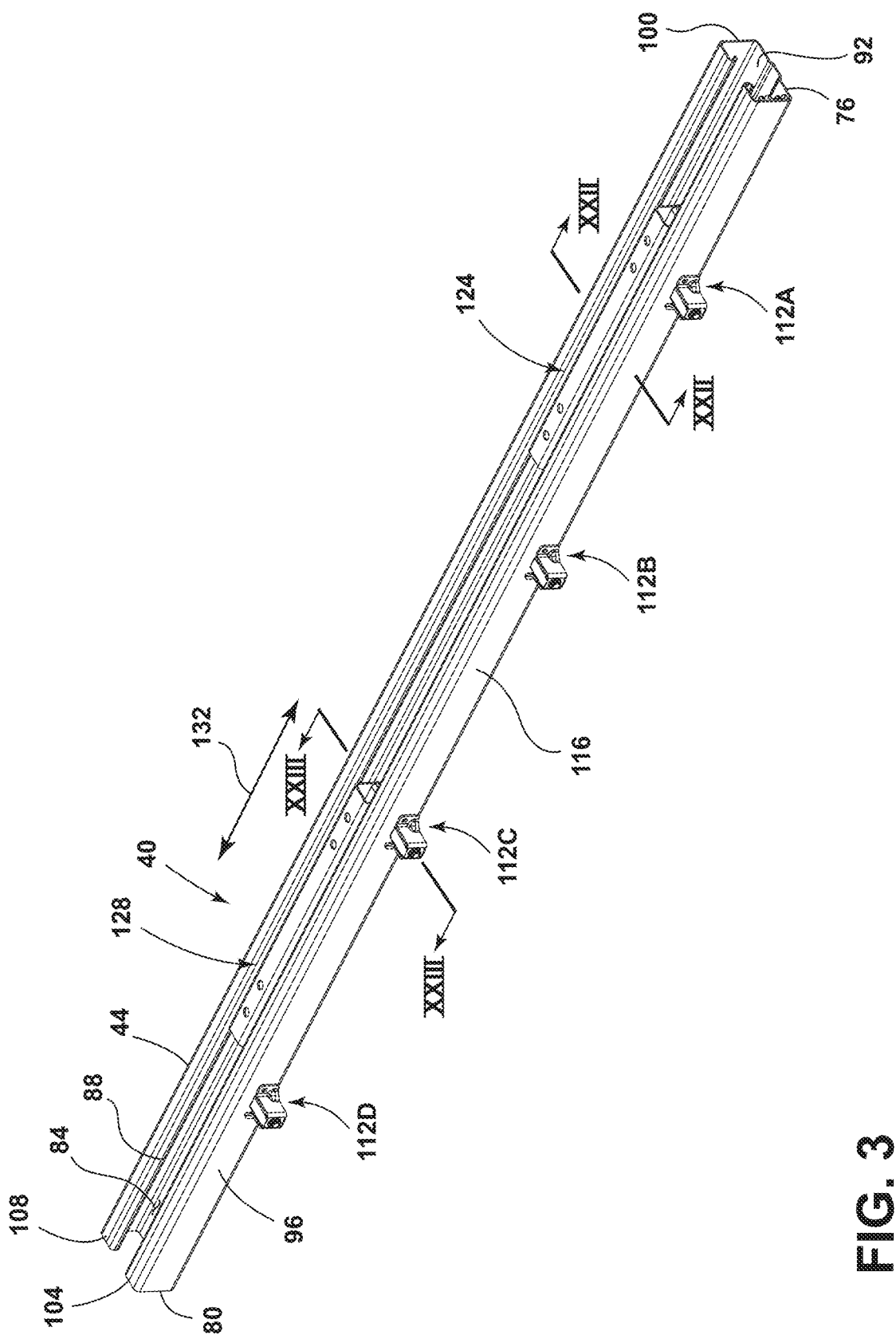
FIG. 3 is a side perspective view of one of the rail assemblies, illustrating first and second carriage assemblies, according to one example.
Figure 4:
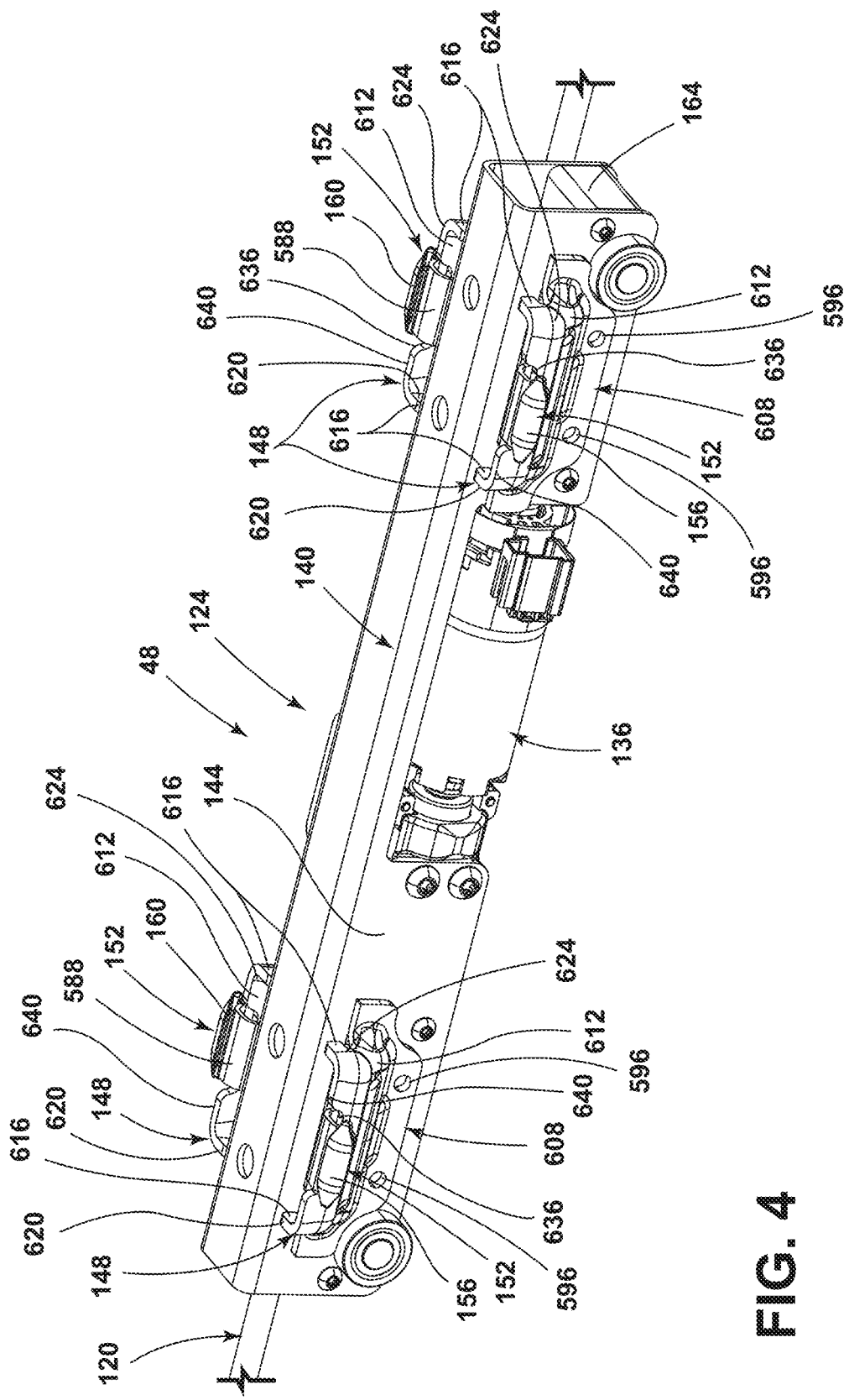
FIG. 4 is a side perspective view of one of the carriage assemblies, illustrating various components on a first side thereof, according to one example.
Figure 5:
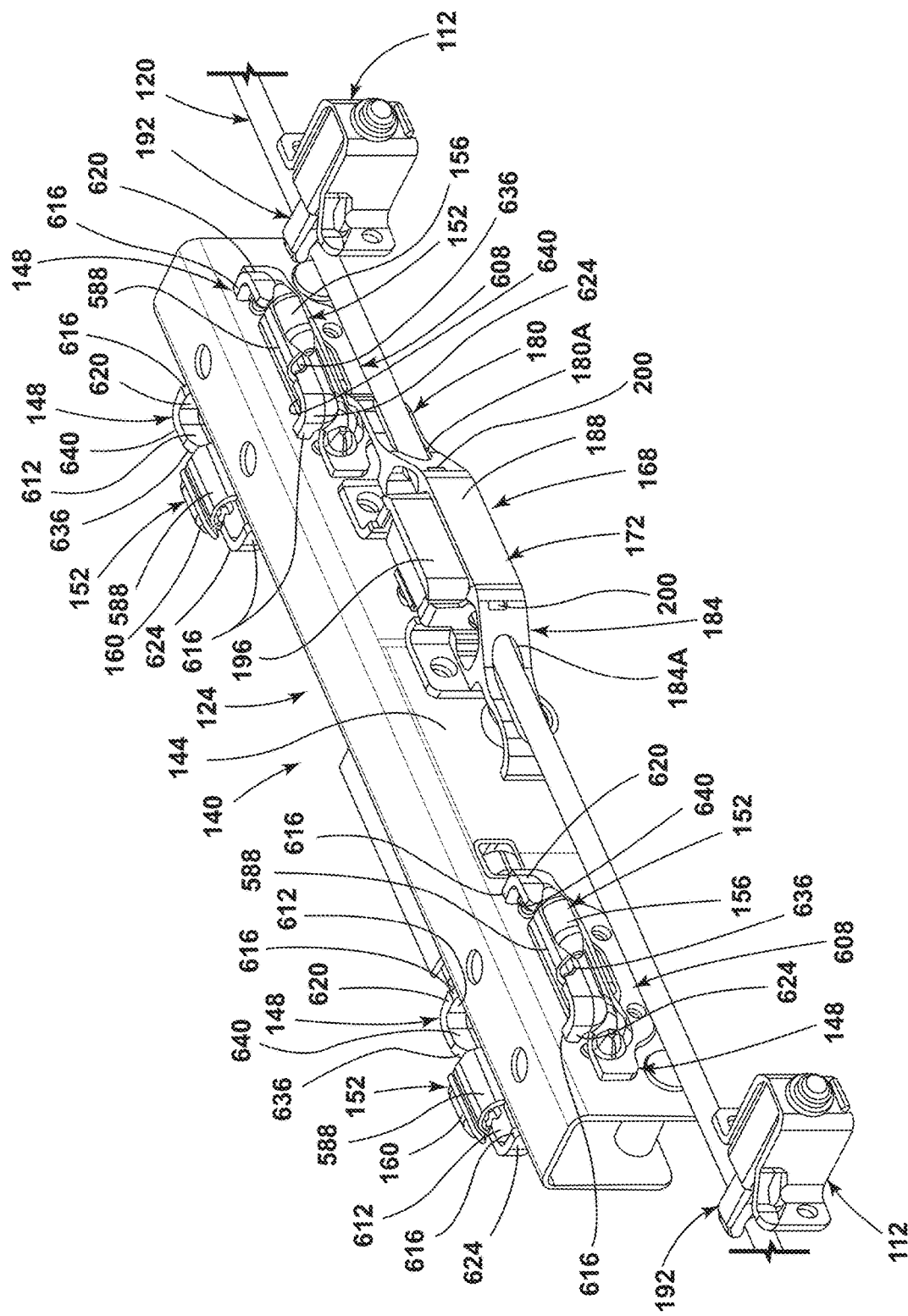
FIG. 5 is a side perspective view of one of the carriage assemblies, illustrating various components on a second side thereof, according to one example.
Figure 6:
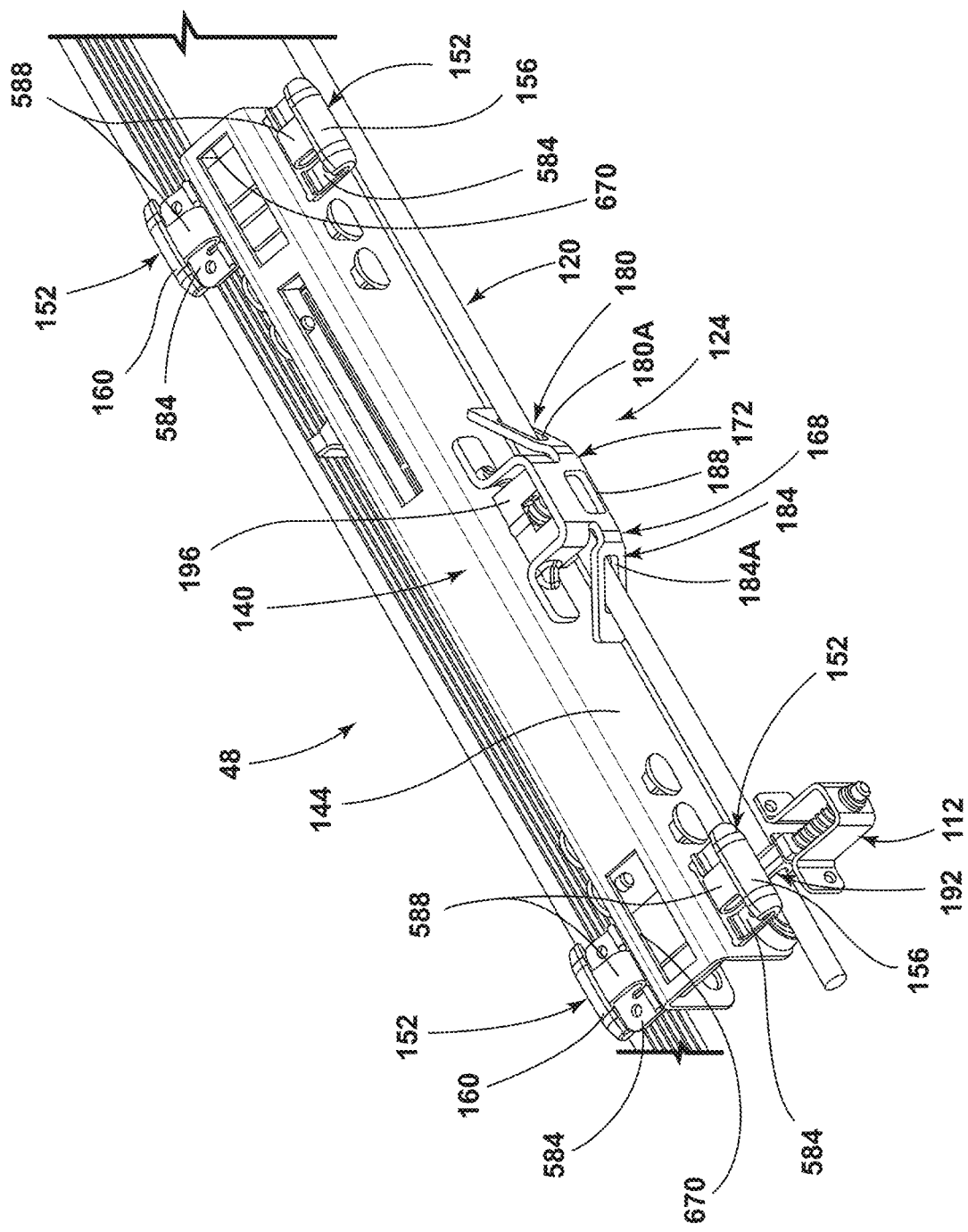
FIG. 6 is a top perspective view of one of the carriage assemblies, illustrating various components thereof, according to another example.
Figure 7:
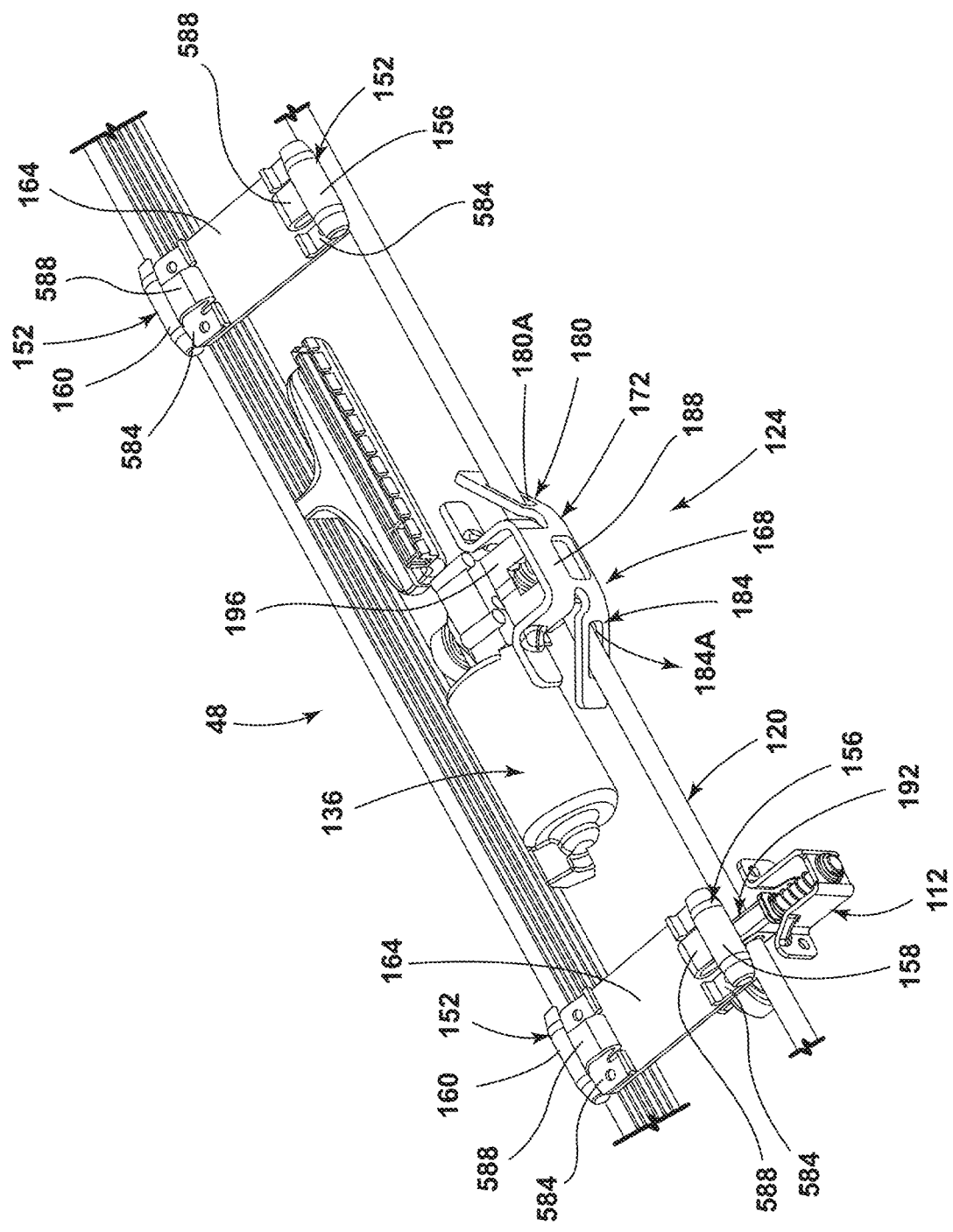
FIG. 7 is a top perspective view of one of the carriage assemblies with a body portion removed to reveal interior components of the carriage assembly, according to one example.

Referring now to FIG. 3, the rail assembly 40 is shown including the track assembly 44. The track assembly 44 can have a generally U-shaped cross section. The track assembly 44 includes first and second ends 76, 80 and an interior portion 84 with a centrally disposed slot 88 opening into the interior portion 84. The track assembly 44 further includes a bottom wall 92 having first and second sidewalls 96, 100 upwardly extending therefrom, and first and second upper walls 104, 108 inwardly extending towards one another, yet spaced-apart to define the centrally disposed slot 88. As further shown in FIG. 3, a plurality of support assemblies 112 (denoted 112A-112D) are shown operably coupled to an outer surface 116 of the first sidewall 96. The outer surface 116 of the track assembly 44 is considered part of an overall exterior portion of the track assembly 44. In use, the support assemblies 112A-112D are used to selectively support an elongate shaft 120 (FIG. 4) that is contemplated to be mounted within the interior portion 84 of the track assembly 44. As further shown in FIG. 3, first and second carriage assemblies 124, 128 are shown disposed within the interior portion 84 of the track assembly 44 for movement along the centrally disposed slot 88 between fore and aft positions in a direction as indicated by arrow 132. In use, the first and second carriage assemblies 124, 128 are configured to support a variety of components within a vehicle interior that are adjustably supported by the rail assembly 40 for movement within the vehicle interior. Such components supported by the rail assembly 40 could include seat assemblies, consoles, storage compartments, and other such components that are suitable for adjusting a position thereof within a vehicle interior.

Referring again to FIG. 3, the rail assembly 40 is contemplated to be an elongate rail assembly which may include multiple track assemblies 44 for supporting a vehicle component. For instance, a second track assembly 44 mirroring the track assembly 44 may be used with the rail assembly 40 to support opposed sides of the seating assembly 52 along parallel track assemblies 44 (see FIGS. 1 and 2). The extended length of the rail assembly 40 allows for increased adjustability in a component's position as supported thereon. In the example of the seating assembly 52, it may be useful for the rail assembly 40 to provide elongate adjustable support when the seating assembly 52 is rotated by a user between forward-facing and rearward-facing configurations. In supporting such a seating assembly 52, the rail assembly 40 provides for ample adjustability to move the seating assembly 52 along the track assemblies for accommodating legroom of a seat occupant in both the forward-facing and rearward-facing configurations. In various examples, it is contemplated that the rail assembly 40 can provide a range of motion of approximately 1500 millimeters or more. The track assembly 44 shown in FIG. 3 includes evenly spaced support assemblies 112A-112D. In some examples, the support assemblies 112A-112D can be placed approximately 300 millimeters apart along a 1500 millimeter track assembly 44. In rail assemblies of approximately 600 millimeters, the need for intermediate support may be obviated. However, with the elongate rail assembly 40 of the present concept, intermediate support for the elongate shaft 120 is provided via the support assemblies 112A-112D along the length of the track assembly 44 to ensure that the elongate shaft 120 is properly supported within the interior portion 84 of the track assembly 44. Additionally or alternatively, the support assemblies 112A-112D can be utilized as load-transfer assemblies such that external loads that are applied to the elongate shaft 120 (e.g., gravity, rail-mounted component forces, and/or impact forces), can be transferred from the elongate shaft 120 to the support assemblies 112A-112D and ultimately to the track assembly 44.

Referring to FIGS. 4-7, examples of the carriage assemblies 48 are shown removed from the track assembly 44 to enable discussion of various details of the first and second carriage assemblies 124, 128. For the sake of brevity, discussion of the aspects of the carriage assemblies 124, 128 will refer to the first carriage assembly 124. However, the aspects discussed with regard to the first carriage assembly 124 may apply in whole or in part to the second carriage assembly 128. The carriage assembly 124 can be provided with an actuator 136 that drives movement of the carriage assembly 124 along the elongate shaft 120. The actuator 136 can be supported by and/or housed within a body portion 140 of the carriage assembly 124. The body portion 140 of the carriage assembly 124 includes an exterior surface 144. One or more retaining brackets 148 may be fastened or otherwise mounted to the exterior surface 144. In various examples, a guide assembly 152 can be fastened or otherwise mounted to the exterior surface 144. In some examples, the guide assembly 152 may be associated with, or co-localized with, one or more of the retaining brackets 148. That is, the guide assembly 152 may be positioned in close proximity to one or more of the retaining brackets 148. The guide assemblies 152 can each include first and second guide members 156, 160 disposed on opposite sides of a spacer member 164. A coupling assembly 168 is configured to couple to the exterior surface 144 of the body portion 140 of the carriage assembly 48. The coupling assembly 168 is shown engaged with the elongate shaft 120, as further described below. With reference to the first carriage assembly 124, the coupling assembly 168 is shown coupled to the exterior surface 144 of the body portion 140 of the first carriage assembly 124, and further coupled to the elongate shaft 120. In this way, the coupling assemblies 168 couple the first and second carriage assemblies 124, 128 to the elongate shaft 120 for movement therealong, as further described below. The coupling assembly 168 can include a slider bracket 172 having first and second ramp portions 180, 184 disposed on opposite sides thereof with an intermediate portion 188 disposed therebetween. The first and second ramp portions 180, 184 are disposed at inclined angles relative to the elongate shaft 120 and are at opposed angles to one another. The first and second ramp portions 180, 184 further include receiving apertures 180A, 184A, respectively, through which the elongate shaft 120 is received. In this way, the slider bracket 172 serves as a coupling between the first carriage assembly 124 and the elongate shaft 120. The specific configuration of the slider bracket 172 allows for an engagement feature 192 of the various support assemblies 112 to move from the deployed position, shown in FIG. 10, to a retracted position, shown in FIG. 16B. This is due to the first carriage assembly 124 moving along the elongate shaft 120 in the direction as indicated by arrow 132 (see FIG. 3), such that the first and second ramp portions 180, 184 of the slider bracket 172 can act as introductory ramps which urge the engagement feature 192 of an associated support assembly 112 into the retracted position, and then guide the same engagement feature 192 towards the deployed position as the carriage assembly 48, such as first carriage assembly 124, is driven past the associated support assembly 112, such as support assembly 112A. The interaction of the slider bracket 172 of the coupling assembly 168 with the support assemblies 112A-112D of the present concept is further described below with reference to FIGS. 14A-18B. In various examples, the carriage assembly 48 can be provided with a gear box 196 that is positioned between the intermediate portion 188 of the slider bracket 172 and the exterior surface 144 of the body portion 140 of the carriage assembly 48. In some examples, the intermediate portion 188 may be removable to provide access to the gear box 196, enable installation of the gear box 196, and/or enable servicing of the gear box 196 and its components. For example, the intermediate portion 188 may be pried off of the slider bracket 172 by placing a flat instrument, such as a flat-head screwdriver, within an access slot 200 and bearing against the slider bracket 172 to decouple the intermediate portion 188 and/or the gear box 196 from the slider bracket 172. The access slot 200 may be provided on either side of the intermediate portion 188. The access slot 200 may be at least partially defined by a proximate portion of the first ramp portion 180 and/or a proximate portion of the second ramp portion 184.

Figure 8:
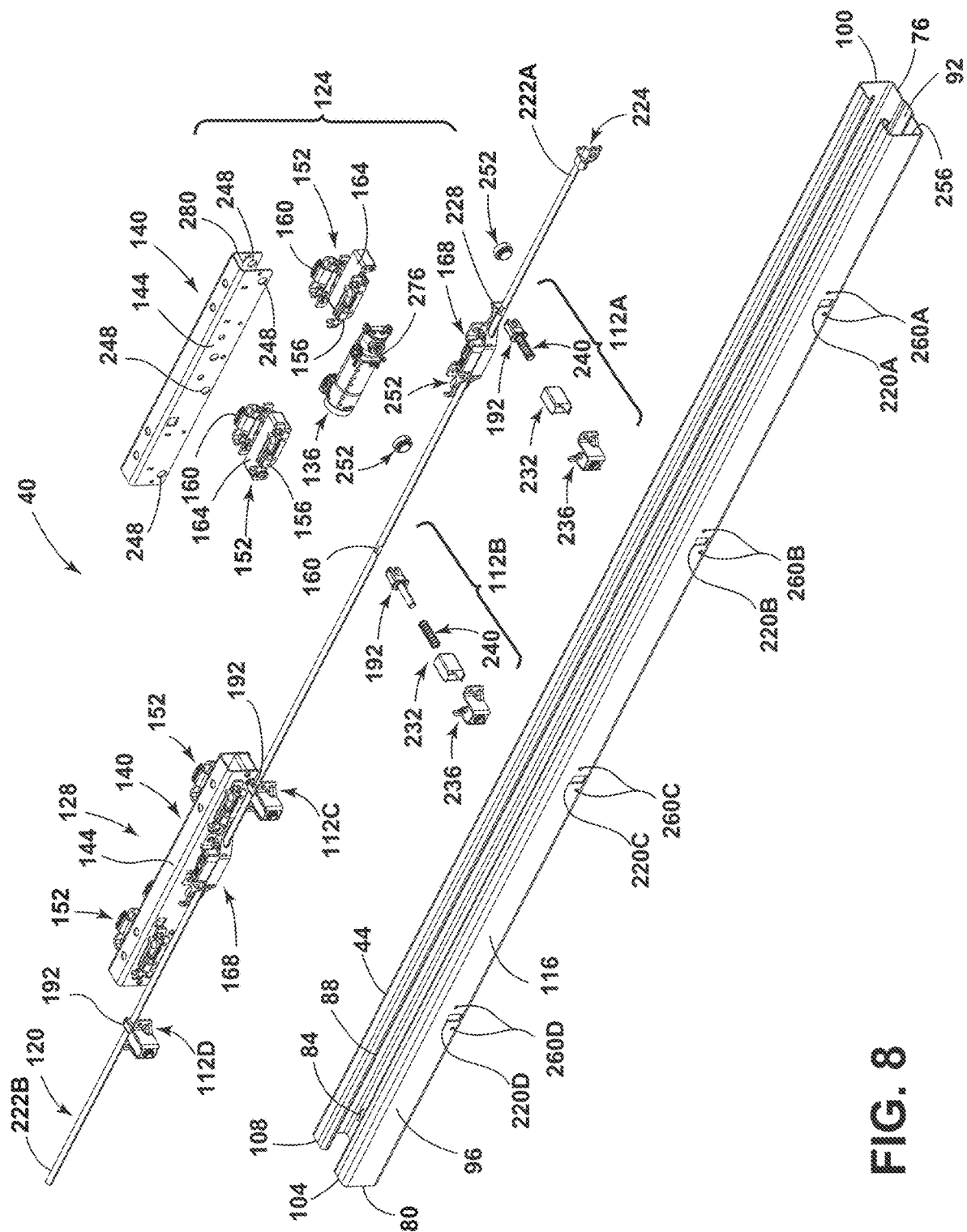
FIG. 8 is a top perspective view of the rail assembly with components exploded away therefrom.
Figure 20:
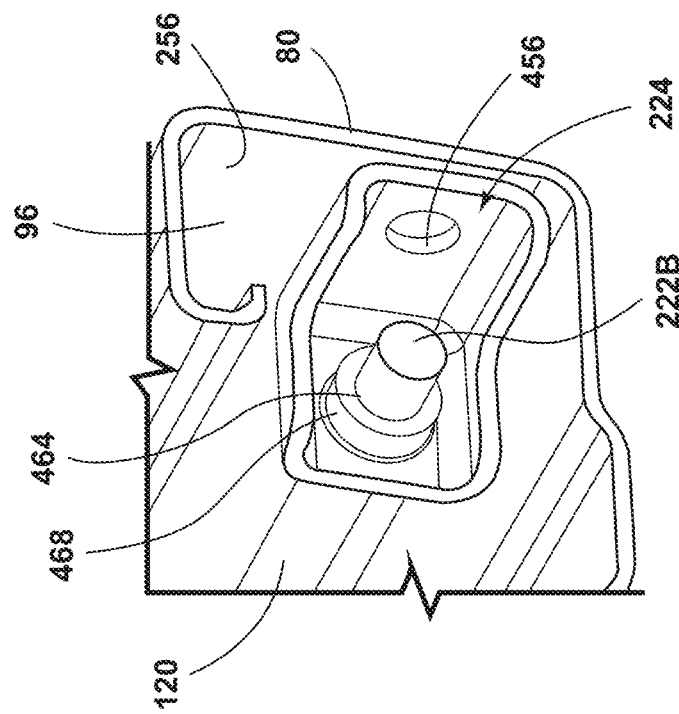
FIG. 20 is a side perspective view of a second end of the track assembly of the rail assembly, illustrating a second mounting bracket engaging with the elongate shaft, according to one example.
Figure 19:
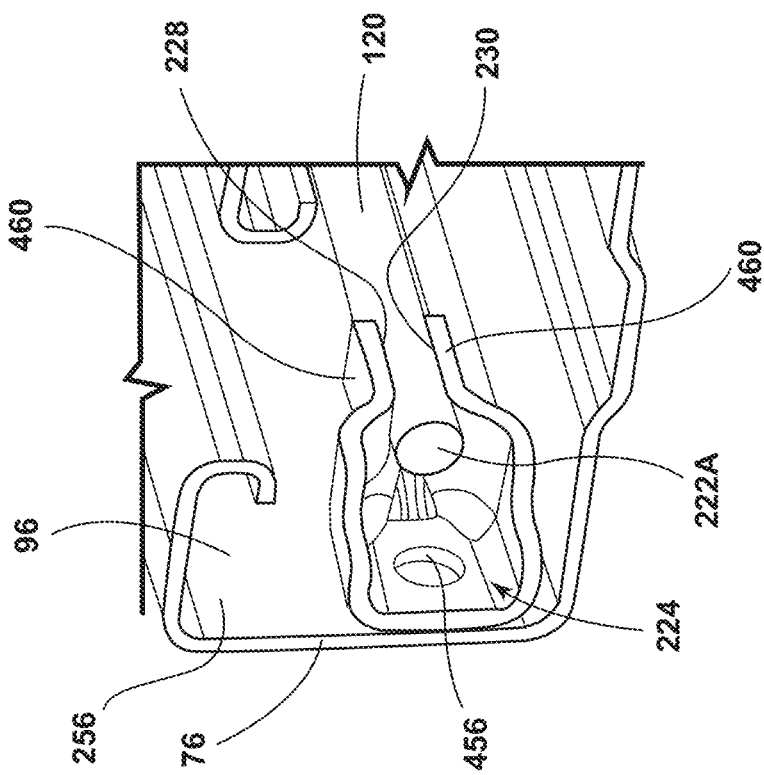
FIG. 19 is a side perspective view of a first end of a track assembly of the rail assembly, illustrating a first mounting bracket engaging with an elongate shaft, according to one example.

Referring now to FIG. 8, the support assemblies 112A-112D are shown exploded away from the track assembly 44, along with the first and second carriage assemblies 124, 128. Further, the elongate shaft 120 is shown exploded away from the interior portion 84 of the track assembly 44. With the support assemblies 112A-412D removed from the track assembly 44, access apertures 220A-220D can be seen disposed through the first sidewall 96 of the track assembly 44. Further, mounting apertures 260A-260D are shown disposed on opposite sides of the access apertures 220A-220D, respectively. In use, the mounting apertures 260A-260D are used to mount the support assemblies 112A-112D, respectively, to an exterior portion of the track assembly 44, such as the outer surface 116 of first sidewall 96. The access apertures 220A-220D open into the interior portion 84 of the track assembly 44, such that features of the support assemblies 112A-112D can access the elongate shaft 120 as mounted within the interior portion 84 of the track assembly 44 in use. In FIG. 8, the elongate shaft 120 is shown as having first and second ends 222A, 222B with a mounting bracket 224 shown positioned on the first end 222A for mounting the elongate shaft 120 to an inner surface 256 of the first sidewall 96 at the first end 222A of the track assembly 44. Mounting bracket 224 is also shown in FIGS. 19 and 20 on the inner surface 256 of the first sidewall 96. As can be seen in FIGS. 19 and 20, the second end 80 of the elongate shaft 120 may also include a mounting bracket similar to mounting bracket 224 to couple the elongate shaft 120 to the second end 80 of the track assembly 44.

As further shown in FIG. 8, the support assemblies 112A and 112E are exploded away from the elongate shaft 120, to reveal upper notches 228 disposed on the elongate shaft 120. Support assemblies 112C and 112D are shown in FIG. 8 as being engaged with the elongate shaft 120. With specific reference to support assembly 112B, the support assemblies 112A-112D each include a housing 232, the engagement feature 192, a support bracket 236, and a biasing member 240. In use, the engagement feature 192 is contemplated to move between deployed and retracted positions relative to the housing 232. The biasing member 240 is contemplated to couple to the engagement feature 192, as shown with specific reference to support assembly 112A in FIG. 8, to bias the engagement feature 192 to the deployed position. The housing 232 is configured to couple to the support bracket 236 which is configured to mount to the exterior of the track assembly 44, such as outer surface 116 of the first sidewall 96 at mounting apertures 260A-260D. The access apertures 220A-220D are configured to provide access to the interior portion 84 of the track assembly 44 for the engagement features 192 to engage the elongate shaft 120 when the engagement features 192 are in the extended or deployed position. Thus, the support assemblies 112A-112D are mounted to the outer surface 116 of the track assembly 44, as shown in FIG. 3 over the access apertures 220A-220D, such that, the access apertures 220A-220D provide access for the engagement features 192 to reach the interior portion 84 of the track assembly 44 in which the elongate shaft 120 is mounted. In this way, the support assemblies 112A-112D can selectively support the elongate shaft 120 at spaced intervals along a length of the elongate shaft 120 between the first and second ends 222A, 222B thereof. The selective engagement of the elongate shaft 120 by the support assemblies 112A-112D is further described below.

With further reference to FIG. 8, the first carriage assembly 124 is shown in an exploded view while the second carriage assembly 128 is shown in an assembled configuration and operably coupled to the elongate shaft 120 between support assemblies 112C and 112D. In FIG. 8, the engagement features 192 of support assemblies 112C and 112D are shown engaged with the elongate shaft 120 to support the same under the weight of an object supported on the second carriage assembly 128. As noted above, the first carriage assembly 124 is shown in an exploded view, and the parts thereof will now be described and are contemplated to also describe the component parts of the second carriage assembly 128. As shown in FIG. 8, the first carriage assembly 124 includes a body portion 244 having a generally inverted U-shaped configuration. The body portion 244 further includes a plurality of mounting apertures 248 that can be used to mount rollers 252 to the body portion 244 for providing rolling support of the first carriage assembly 124 along the bottom wall 92 of the track assembly 44. As further shown in FIG. 8, the first carriage assembly 124 further includes first and second guide assemblies 152 that each include first and second guide members 156, 160 disposed on opposite sides of a spacer member 164. In use, the guide members 156, 160 are configured to engage inner surfaces of the upper walls 104, 108 of the track assembly 44 as the first carriage assembly 124 moves along the length of the track assembly 44. Alternatively, the guide members 156, 160 may be independently mounted to the carriage assembly 124, 128, as will be described further herein. The first carriage assembly 124 further includes an actuator 136 having a drive shaft 276 that is configured to rotate as powered by the actuator 136 to drive movement of the first carriage assembly 124 along the elongate shaft 120, as further described below. In assembly, the first and second guide assemblies 152 and the actuator 136 are contemplated to be mounted within an interior portion 280 of the body portion 244 of the first carriage assembly 124. A coupling assembly 168 is configured to couple to an exterior surface 144 of the body portion 244. As shown in FIG. 8, the coupling assembly 168 is shown engaged with the elongate shaft 120, as further described below. With reference to the second carriage assembly 128, the coupling assembly 168 is shown coupled to the exterior surface 144 of the body portion 244 of the second carriage assembly 128, and further coupled to the elongate shaft 120. In this way, the coupling assemblies 168 couple the first and second carriage assemblies 124, 128 to the elongate shaft 120 for movement therealong, as further described below.

Figure 9C:
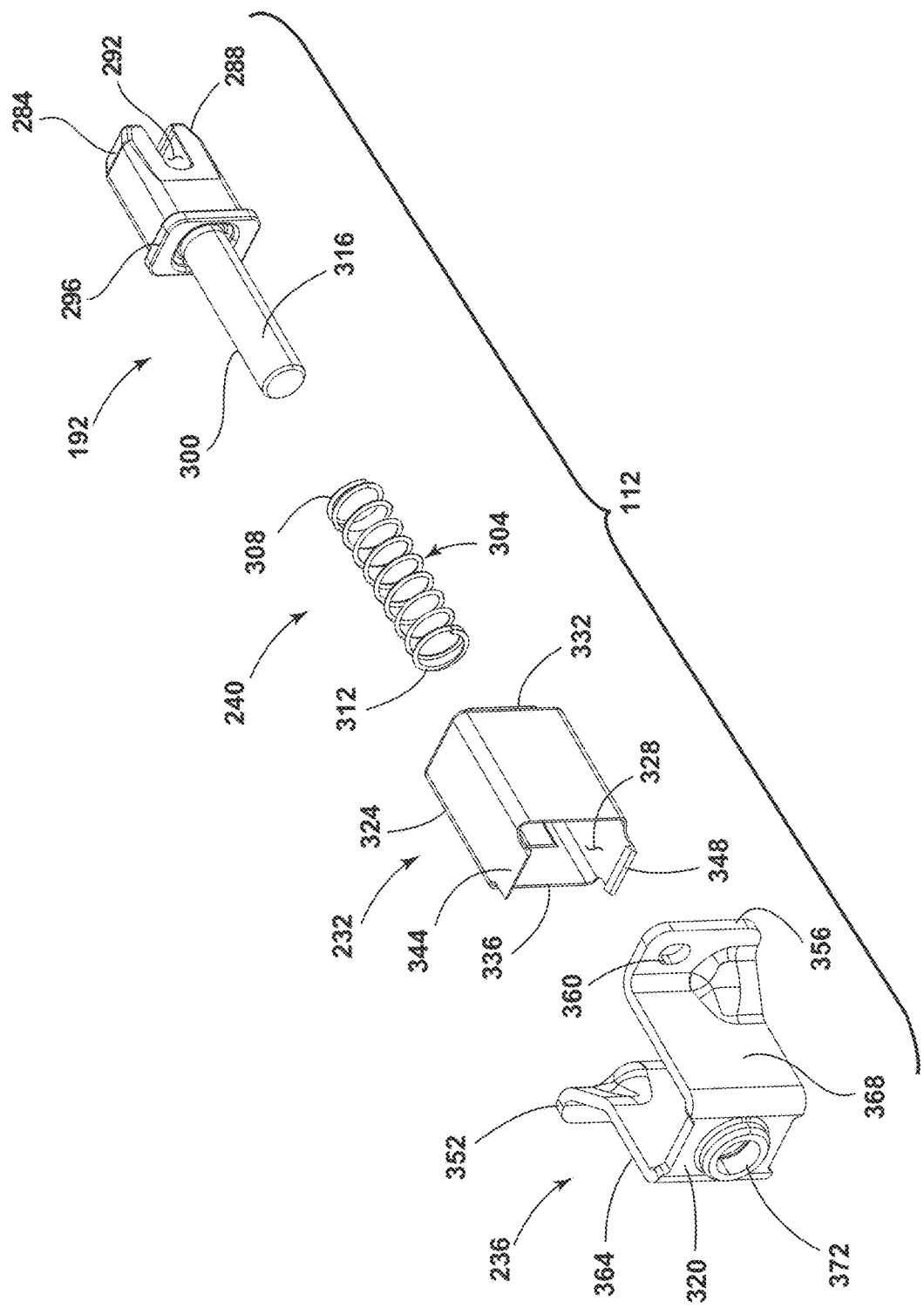
FIG. 9C is an exploded top perspective view of the support assembly, according to one example.

Referring now to FIGS. 9A-9C, a support assembly 112 is shown and contemplated to represent the support assemblies 112A-112D shown in FIGS. 3 and 5-8. In FIG. 9, the support assembly 112 includes the engagement feature 192 having first and second engagement members 284, 288 that are vertically spaced-apart from one another to define a receiving area 292 therebetween. The engagement feature 192 further includes an abutment wall 296 and a stem portion 300 rearwardly extending from the abutment wall 296. Thus, in assembly, the engagement feature 192 includes the first and second engagement members 284, 288 outwardly extending from the stem portion 300. The first and second engagement members 284, 288 may be referred to herein as upper and lower engagement members as they are configured to engage upper and lower sides of the elongate shaft 120, as further described below. As further shown in FIG. 9, the biasing member 240 is shown in the form of a coil spring 304 or compression spring having first and second ends 308, 312. In use, the biasing member 240 is received on an outer surface 316 of the stem portion 300 of the engagement feature 192, such that the first end 308 abuts the abutment wall 296, and the second end 312 is configured to abut the support bracket 236 at a rear wall 320 thereof. As further shown in FIG. 9, the housing 232 of the support assembly 112 includes an outer wall 324 defining an interior portion 328 having front and rear openings 332, 336. It is contemplated that the housing 232 has a cross-sectional configuration that closely matches the contours of the abutment wall 296 of the engagement feature 192. The engagement feature 192 is configured to slidingly engage the housing 232 within the interior portion 328 thereof. Specifically, in assembly, the engagement feature 192 enters into the rear opening 336 of the housing 232 until the first and second engagement members 284, 288 extend outwardly from the front opening 332 of the housing 232 (as best shown in FIG. 9A). The abutment wall 296 of the engagement feature 192 is configured to abut an inner surface of a front retaining wall 340 of the housing 232 when the engagement feature 192 is in the deployed position to keep the engagement feature 192 from passing through the front opening 332.

As further shown in FIGS. 9A-9C, the housing 232 includes upper and lower clip members 344, 348 which are contemplated to couple to the rear wall 320 of the support bracket 236. As further shown in FIGS. 9A-9C, the support bracket 236 includes mounting portions 352, 356 having mounting apertures 360 disposed therethrough which are configured to align with the mounting apertures 260A-260D of the track assembly 44. Rearwardly extending sidewalk 364, 368 are interconnected by the rear wall 320 of the support bracket 236. The support bracket 236 further includes a receiving aperture 372 disposed through the rear wall 320. The stem portion 300 of the engagement feature 192 is contemplated to be slidably received through the receiving aperture 372 of the support bracket 236 between extended and retracted positions as the engagement feature 192 plunges between the deployed and retracted positions relative to the housing 232. In assembly, rear wall 320 of the support bracket 236 covers the rear opening 336 of the housing 232 to close off the same, such that the engagement feature 192 is positively captured within the interior portion 328 of the housing 232, yet slideably disposed therein.

Referring still further to FIGS. 9A-9C, the elongate shaft 120 includes upper and lower notches 228, 230 which include flat outer surfaces 228A, 230A, respectively. The notches 228, 230 are inset from an outer perimeter of the threaded cylindrical body portion 244 of the elongate shaft 120. The upper and lower notches 228, 230 are configured to receive the first and second engagement members 284, 288. With the first and second engagement members 284, 288 disposed on opposite sides of the elongate shaft 120 within the notches 228, 230, the elongate shaft 120 is supported on both upper and lower sides of the elongate shaft 120. While the elongate shaft 120 is a threaded member, the elongate shaft 120 does not rotate, but rather, is a stationary member upon which the carriage assemblies, such as carriage assemblies 124, 128, move along in a threaded engagement. Thus, the notches 228, 230 provide an inset feature along the threaded cylindrical body portion 244 of the elongate shaft 120 to support the same within the interior portion 84 of the track assembly 44. The front opening 332 of the housing 232 includes a collar 332A which is contemplated to be received through an associated access aperture 220A-220D (FIG. 8) disposed through the track assembly 44. in this way, it is contemplated that the outer surface of front retaining wall 340 will contact the outer surface 116 of the track assembly 44 when the support assembly 112 is coupled thereto. Thus, the first and second engagement members 284, 288 are received in the upper and lower notches 228, 230 of the elongate shaft 120 when the first and second engagement members 284, 288 are in the deployed position.

Figure 10:
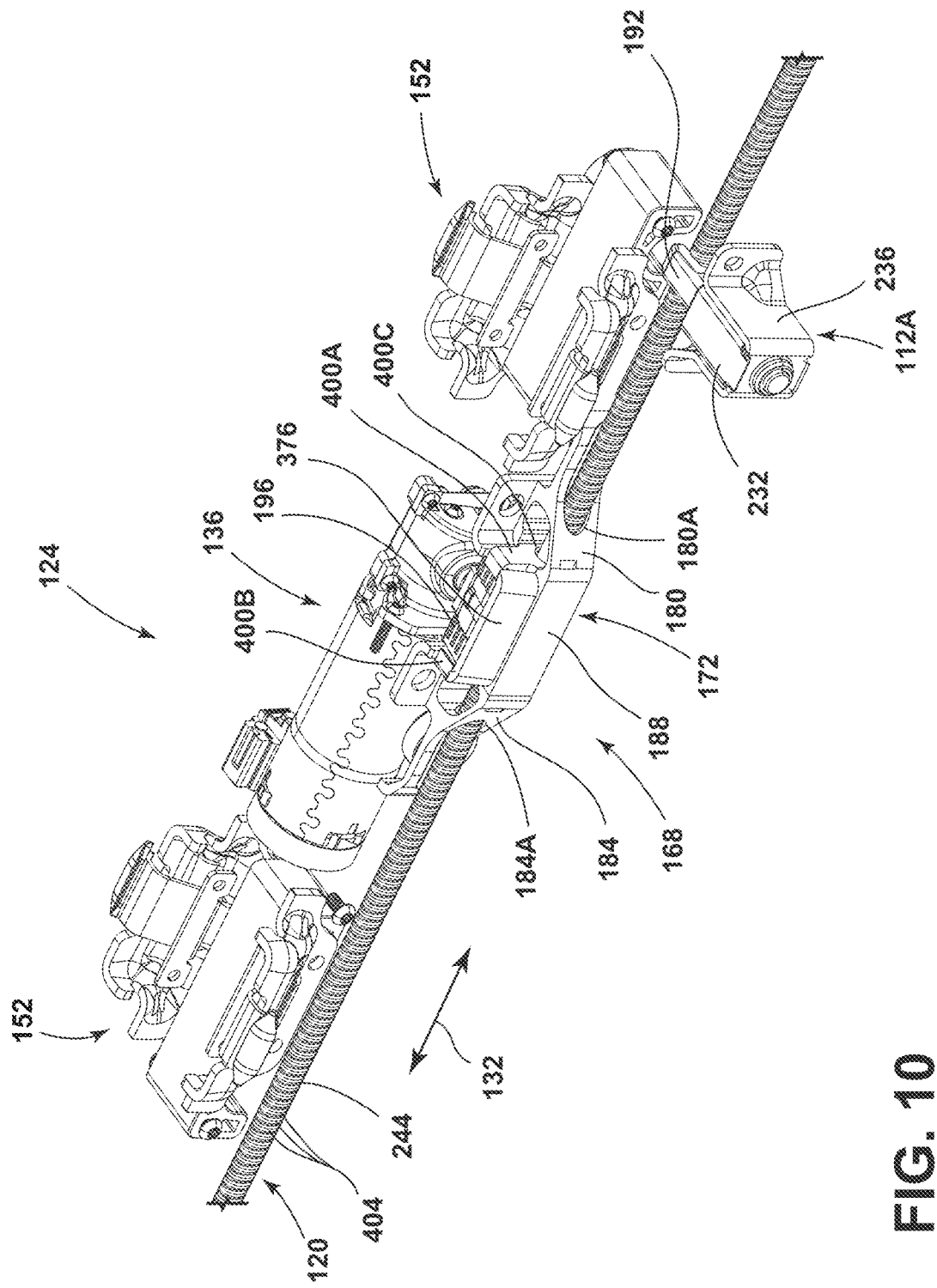
FIG. 10 is a top perceptive view of a coupling assembly coupled to the elongate shaft.

Referring now to FIG. 10, the first carriage assembly 124 is shown with the body portion 140 removed therefrom to reveal the first and second guide assemblies 152 and the actuator 136. As further shown in FIG. 10, the coupling assembly 168 which couples to the exterior surface 144 of the body portion 140 (FIG. 8) is shown engaged with the elongate shaft 120. Specifically, the coupling assembly 168 includes the slider bracket 172 having the first and second ramp portions 180, 184 disposed on opposite sides thereof with the intermediate portion 188 disposed therebetween. The first and second ramp portions 180, 184 are disposed at inclined angles relative to the elongate shaft 120 and are opposed angles to one another. The first and second ramp portions 180, 184 further include receiving apertures 180A, 184A, respectively, through which the elongate shaft 120 is received. In this way, the slider bracket 172 serves as a coupling between the first carriage assembly 124 and the elongate shaft 120. The specific configuration of the slider bracket 172 allows for the engagement feature 192 of the various support assemblies 112A-112D to move from the deployed position, shown in FIG. 10, to a retracted position, shown in FIG. 16B. This is due to the first carriage assembly 124 moving along the elongate shaft 120 in the direction as indicated by arrow 132, such that the first and second ramp portions 180, 184 of the slider bracket 172 can act as introductory ramps which urge the engagement feature 192 of an associated support assembly into the retracted position, and then guide the same engagement feature 192 towards the deployed position as the carriage assembly, such as first carriage assembly 124, is driven past the associated support assembly, such as support assembly 112A. The interaction of the slider bracket 172 of the coupling assembly 168 with the support assemblies 112A-112D of the present concept is further described below with reference to FIGS. 14A-18B. As further shown in FIG. 10, the slider bracket 172 is shown coupled to a mounting bracket 376 in which a gear box 196 is disposed. The slider bracket 172 may be comprised of multiple parts to enable the coupling of the slider bracket 172 to the carriage assembly 48, the elongate shaft 120, and/or the mounting bracket 376.

Figure 11:
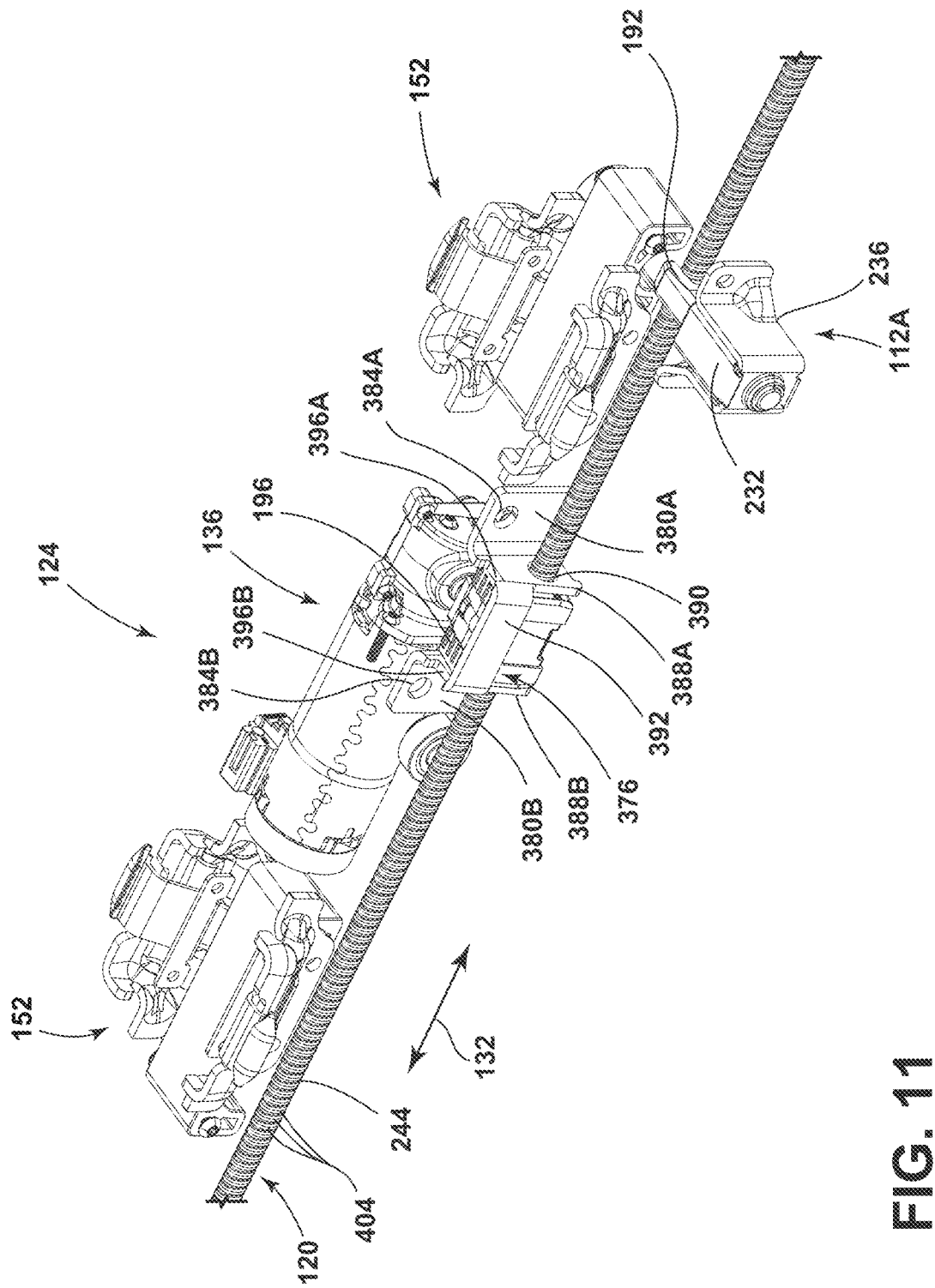
FIG. 11 is a top perceptive view of the coupling assembly with a slider bracket removed.
therefrom to reveal a mounting bracket.

Referring now to FIG. 11, the mounting bracket 376 includes mounting portions 380A, 380B having mounting apertures 384A, and 384B, respectively. The mounting apertures 384A, 384B are used to mount the mounting bracket 376 to the exterior surface 144 of the body portion 140 of a carriage assembly, such as first carriage assembly 124 described above. The mounting bracket 376 further includes sidewalls 388A, 388B which outwardly extend from the mounting portions 380A, 380B, respectively. The sidewalk 388A, 388B include receiving apertures 390 through which the elongate shaft 120 is received. The sidewalls 388A, 388B are interconnected by an intermediate portion 392 and include notches 396A, 396B in which upwardly extending clip members 400A, 400B (FIG. 10) of the slider bracket 172 are received. The interconnection of the slider bracket 172 and the mounting bracket 376 is best shown in FIG. 10. The upwardly extending clip members 400A, 400B of the slider bracket 172 also include access apertures 400C through which the elongate shaft 120 is received. In assembly, and with further reference to FIG. 11, the mounting bracket 376 is disposed around and substantially surrounds a gear box 196 which is mounted on the elongate shaft 120 and gearingly engaged therewith.

Figure 12:
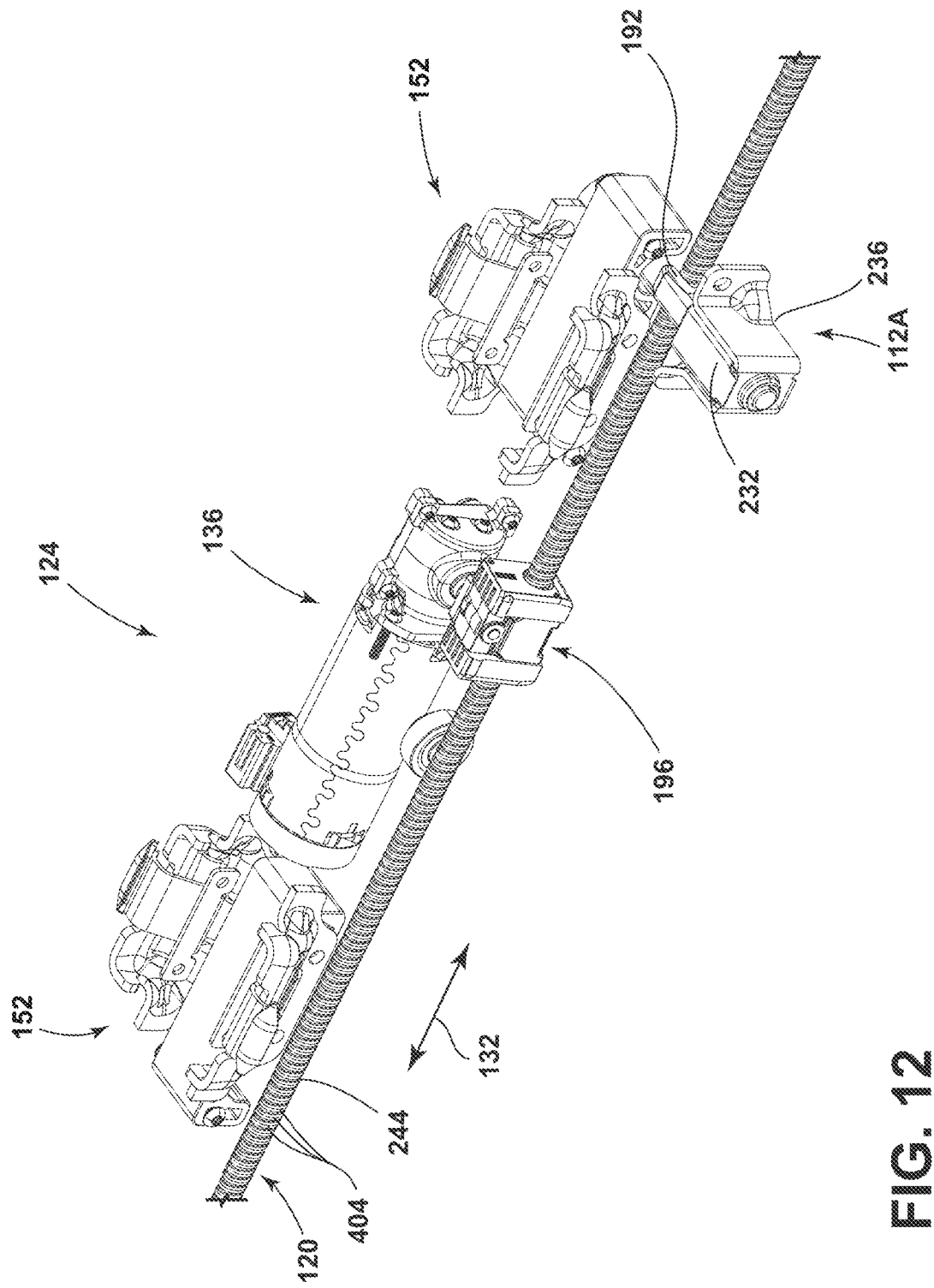
FIG. 12 is a top perceptive view of the coupling assembly with the mounting bracket removed therefrom to reveal a gear box.

Referring now to FIG. 12, gear box 196 is shown and is contemplated to include a geared system which can engage the elongate shaft 120 to power movement of a carriage assembly along the elongate shaft 120. As shown in FIGS. 10-12, the elongate shaft 120 includes a threaded cylindrical body portion 244 having individual threads 404 disposed therealong which are contemplated to be continual progressive threads to which the gear box 196 is gearingly engaged. As used herein, the term "gearingly engaged" refers to a geared relationship between components, wherein movement of one component drives movement of the other, and or drives movement of the moving component relative to the other. With specific reference to the geared relationship between the elongate shaft 120 and the gear box 196, the gear box 196 is contemplated to include a threaded member that is inversely threaded relative to the threaded cylindrical body portion 244 of the elongate shaft 120. In this way, rotation of the threaded member of the gear box 196 drives movement of a carriage assembly, to which the gear box 196 is coupled, along the length of the elongate shaft 120.

Referring now to FIG. 13, the actuator 136 is shown having the drive shaft 276 outwardly extending therefrom. The drive shaft 276 is contemplated to engage the gear box 196 in such a manner that the drive shaft 276 controls rotational movement of the threaded member of the gear box 196. The drive shaft 276 is contemplated to rotate in the direction as indicated by arrow 412 to move a carriage assembly in both forward and rearward directions along the elongate shaft 120 as indicated by arrow 132. The actuator 136 is contemplated to be coupled to a power source of a vehicle for powering movement of an associated component coupled to a carriage assembly in which the actuator 136 is disposed.

Figure 14A:
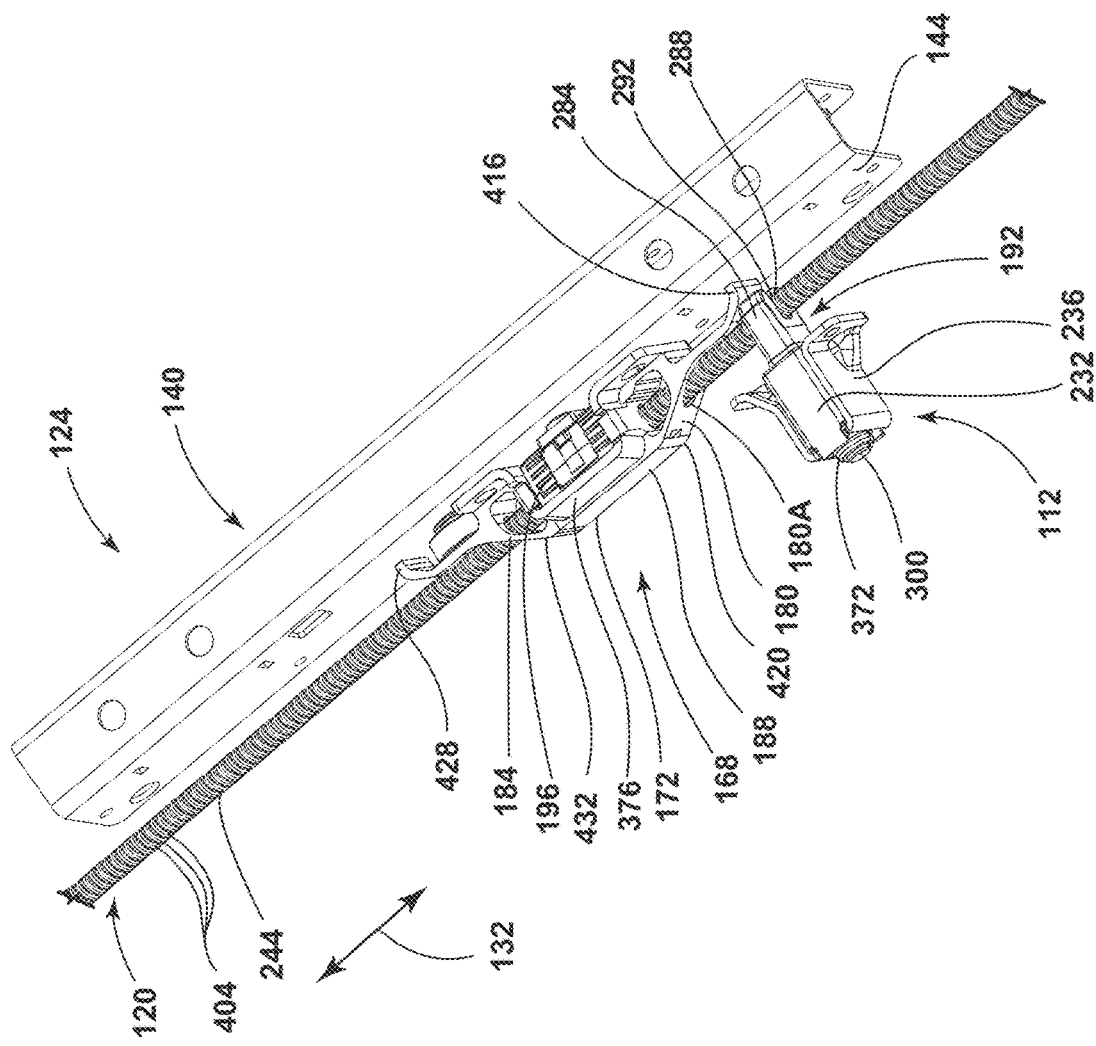
FIG. 14A is a top perspective view of the carriage assembly coupled to the elongate shaft by the coupling assembly and the support assembly coupled to the elongate shaft by the engagement feature, illustrating the engagement feature in a deployed position.
Figure 14B:
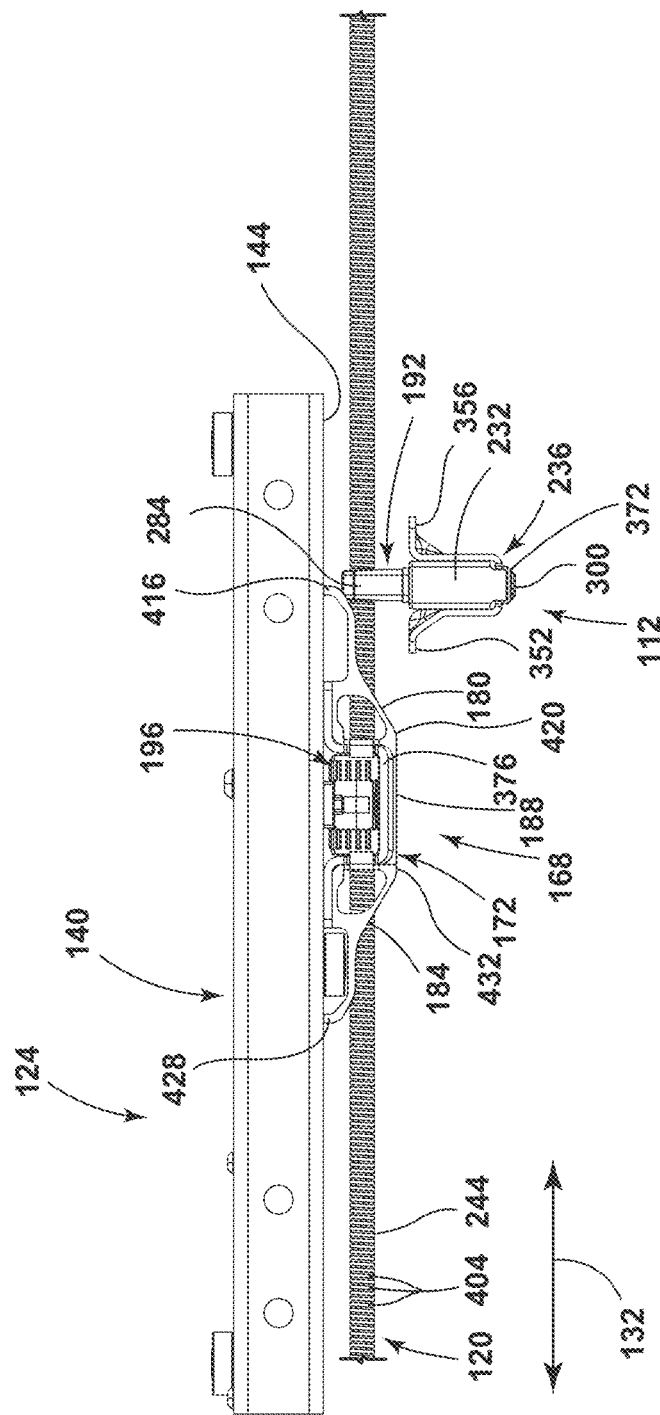
FIG. 14B is a top view of the support assembly and the carriage assembly of FIG. 14A.

Referring now to FIGS. 14A and 14B, the first carriage assembly 124 is shown having the coupling assembly 168 coupled to the exterior surface 144 of the body portion 140. The coupling assembly 168 is shown engaged with the elongate shaft 120. As further shown in FIGS. 14A and 14B, a support assembly 112 is shown engaged with the elongate shaft 120. In FIGS. 14A and 14B, the track assembly 44 (FIG. 1) has been removed to reveal the elongate shaft 120 and the coupling assembly 168 which are normally disposed within the interior portion 84 of the track assembly 44. With the track assembly 44 removed, the engagement feature 192 of the support assembly 112 is shown engaged with the elongate shaft 120 which is normally an engagement occurring within the interior portion 84 of the track assembly 44. With specific reference to FIGS. 14A-18B, the track assembly 44 has been removed to specifically detail the interaction between the support assembly 112 and the coupling assembly 168 of the carriage assembly 124 as the carriage assembly 124 moves past the fixedly mounted support assembly 112. As noted above, the first carriage assembly 124 can move in forward and rearward directions along the elongate shaft 120. For the purposes of the descriptions of the FIGS. 14A-18B, it is contemplated that the first carriage assembly 124 is moving from left to right along the elongate shaft 120.

With specific reference to FIG. 14A, the first and second engagement members 284, 288 are shown outwardly extending from the interior portion 328 of the housing 232 to couple to upper and lower portions of the elongate shaft 120. Specifically, it is contemplated that the first and second engagement members 284, 288 are received within notches disposed on the elongate shaft 120 as described above with reference to FIGS. 9A-9C. In FIG. 14A, the first and second engagement members 284, 288 are fully engaged with the elongate shaft 120 as the engagement feature 192 of the support assembly 112 is shown in the fully deployed position. As the first carriage assembly 124 moves from left to right along the elongate shaft 120, the slider bracket 172 will make contact with the engagement feature 192 to urge the engagement feature 192 from the deployed position to the retracted position given the inclined angle of the first ramp portion 180 of the slider bracket 172. As used herein, the movement from the deployed position to the retracted position may be used to describe the overall engagement feature 192, and/or the first and second engagement members 284, 288 thereof. In the deployed position shown in FIG. 14A, the elongate shaft 120 is shown received within the receiving area 292 defined between the vertically spaced-apart first and second engagement members 284, 288 of the engagement feature 192. As specifically shown in FIG. 14A, the first ramp portion 180 includes a first end 416 and a second end 420. In various examples, the first end 416 can include a curved portion 422 that is positioned between the elongate shaft 120 and the body portion 140 of the carriage assembly 48. The receiving aperture 180A of the first ramp portion 180 is shown disposed between the first end 416 and the second end 420 of the first ramp portion 180. As shown in FIG. 14A, the first end 416 of the first ramp portion 180 is shown disposed on a first side of the elongate shaft 120, while the second end 420 of the first ramp portion 180 is disposed on a second side of the elongate shaft 120 that is opposed to the first side of the elongate shaft 120. Thus, the angled incline of the first ramp portion 180 is configured to draw the first and second engagement members 284, 288 from the first side of the elongate shaft 120 to a second side of the elongate shaft 120 to disengage the elongate shaft 120, as further described below.

Figure 15A:
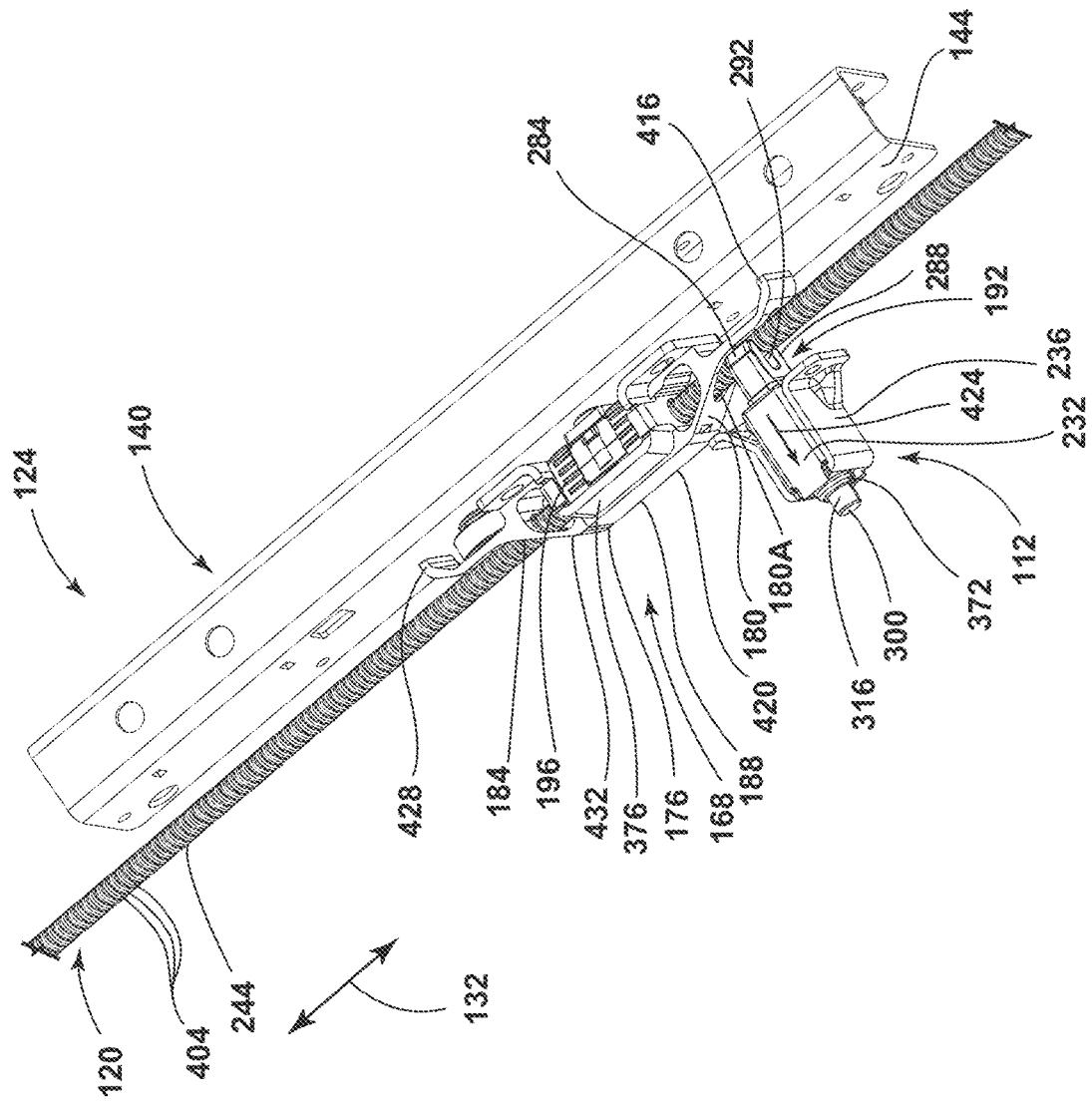
FIG. 15A is a top perspective view of the support assembly and the carriage assembly of FIG. 14A, with the engagement feature of the support assembly engaging the coupling assembly to partially retract the engagement feature.
Figure 15B:
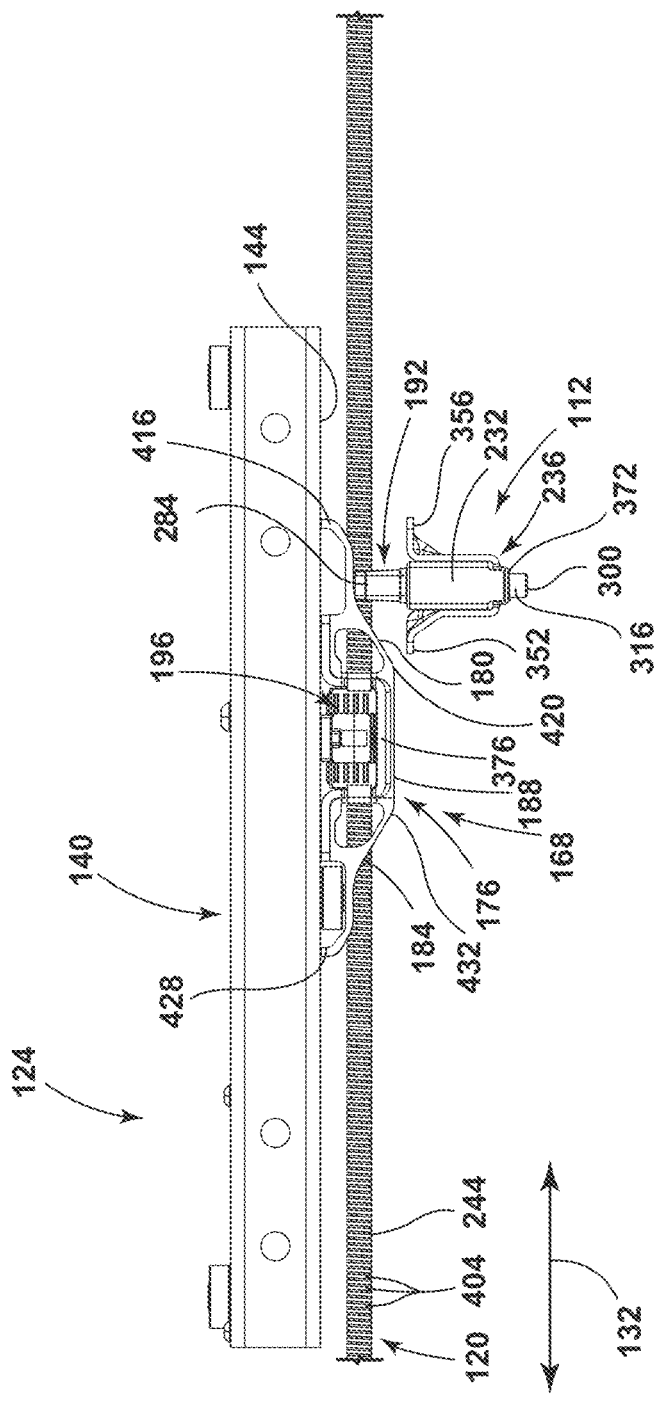
FIG. 15B is a top view of the support assembly and the carriage assembly of FIG. 15A.

Referring now to FIGS. 15A and 15B, the first carriage assembly 124 has moved from left to right relative to the position of the carriage assembly 124 shown in FIGS. 14A and 14B. With this movement of the first carriage assembly 124, the first ramp portion 180 of the slider bracket 172 has contacted the first and second engagement members 284, 288 to then move the engagement member 192 in a rearward direction as indicated by arrow 424. Movement of the engagement feature 192 in the direction as indicated by arrow 424 moves the engagement feature 192 from the deployed position (FIGS. 14A, 14B) towards the retracted. As such, the first ramp portion 180 of the slider bracket 172 acts as an introductory ramp to disengage the engagement feature 192 of the support assembly 112 from the elongate shaft 120 to allow for the first carriage assembly 124 to pass by the support assembly 112. Thus, in FIGS. 15A and 15B, the engagement feature 192 is in a partially retracted position, such that the stem portion 300 of the engagement feature 192 is shown partially extended through the receiving aperture 372 of the support bracket 236 of the support assembly 112.

Figure 16A:
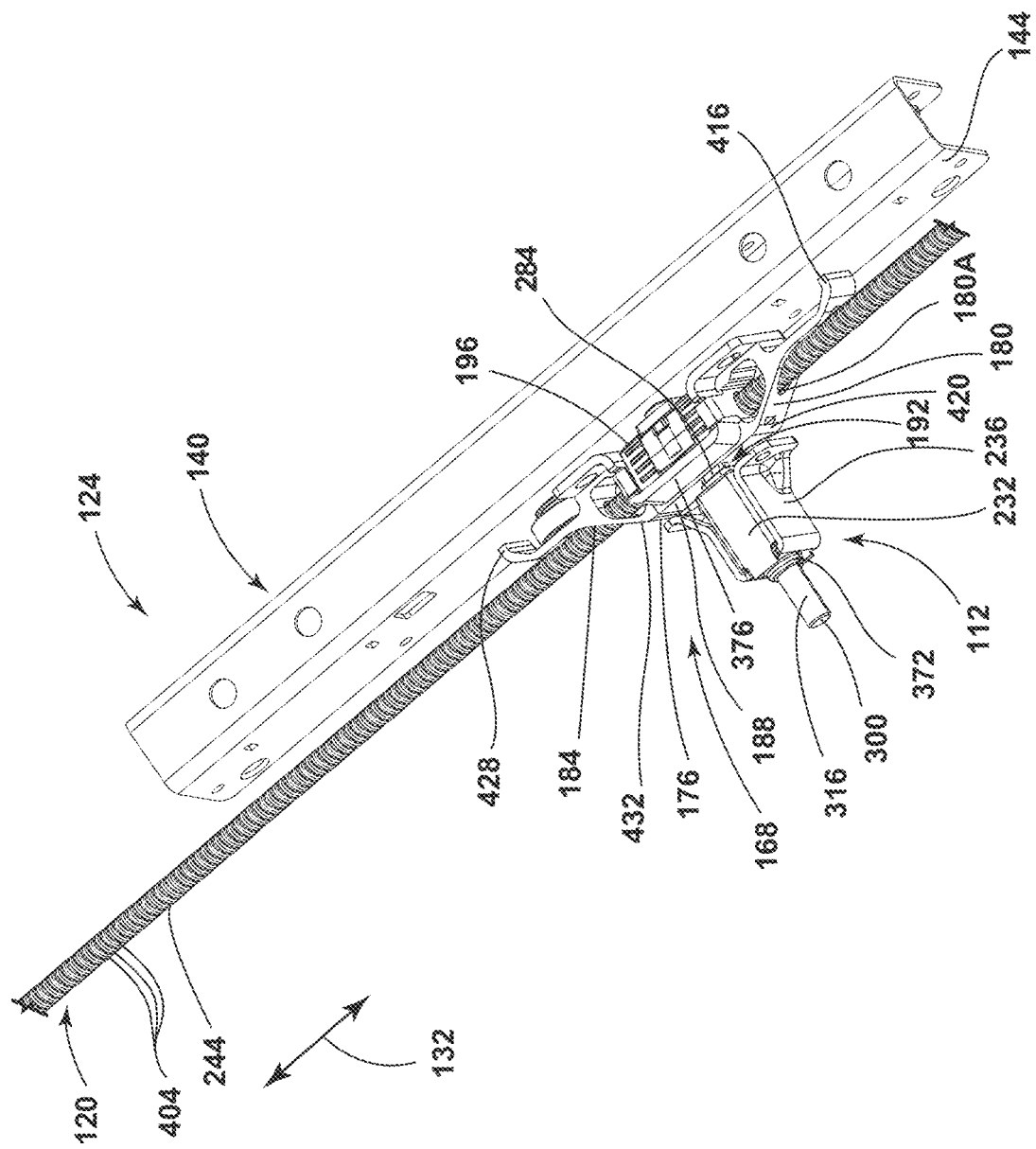
FIG. 16A is a top perspective view of the support assembly and the carriage assembly of FIG. 14A, with the engagement feature of the support assembly engaging the coupling assembly to fully retract the engagement feature.
Figure 16B:
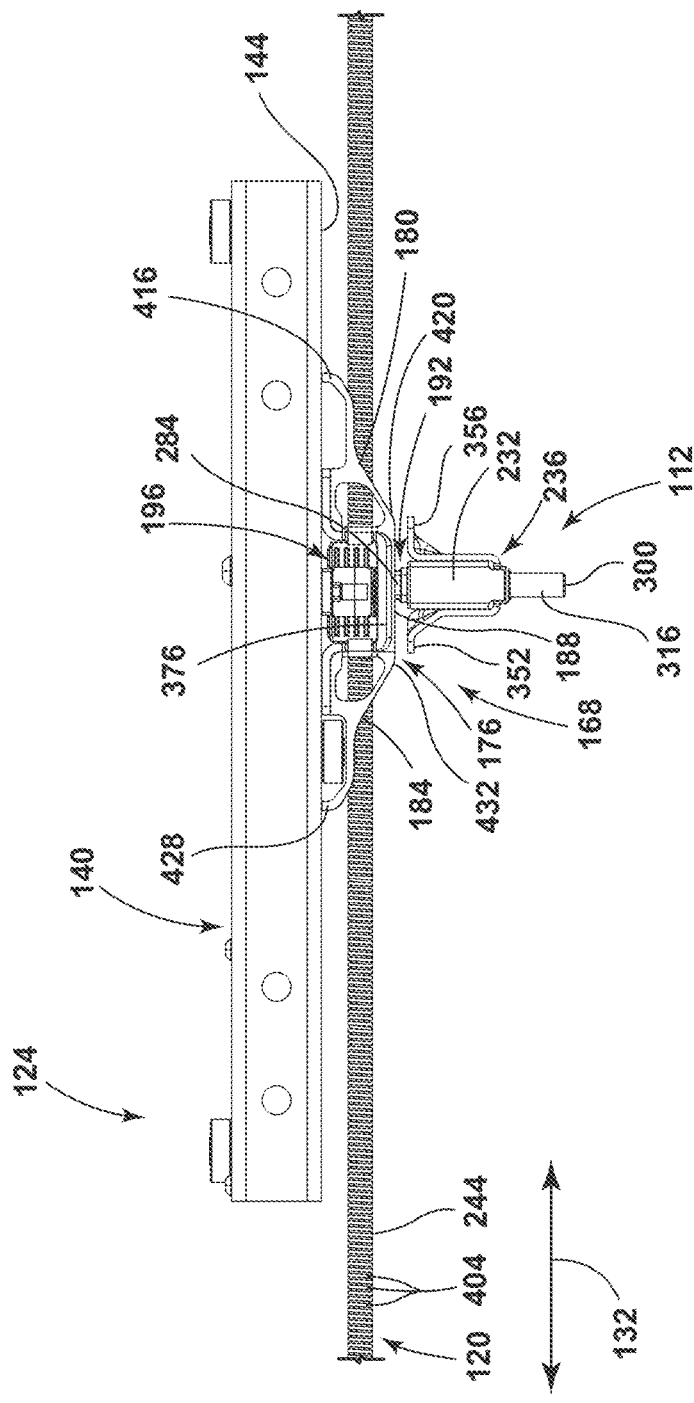
FIG. 16B is a top view of the support assembly and the carriage assembly of FIG. 16A.

Referring now to FIGS. 16A and 16B, the first carriage assembly 124 has further moved from left to right relative to FIGS. 14A-15B, such that the support assembly 112 is now aligned with the intermediate portion 188 of the slider bracket 172. In this way, the engagement feature 192 has moved from having the first and second engagement members 284, 288 disposed on the first side of the elongate shaft 120, to the first and second engagement members 284, 288 being moved to the second and opposite side of the elongate shaft 120 having been urged by the first ramp portion 180 from the first end 416 to the second end 420 thereof. Thus, in FIGS. 16A-16B, the engagement feature 192 is in a fully retracted position, with the first and second engagement members 284, 288 partially retracted into the interior portion 328 of the housing 232 and the stem portion 300 is shown in a fully extended position through the receiving aperture 372 of the support bracket 236. With the engagement feature 192 in the fully retracted position, it is contemplated that the biasing member 240 (FIG. 9C) has been loaded and is configured to bias the engagement feature 192 towards the deployed position. Specifically, it is contemplated that within the interior portion 328 of the housing 232, the abutment wall 296 of the engagement feature 194 acts against the first end 308 of the biasing member 240 to contract the biasing member 240 while the second end 312 thereof abuts the rear wall 320 of the support bracket 236 as the engagement feature 192 retracts. It is further contemplated that the second end 312 of the biasing member 240 could abut a feature of the housing 232 as the engagement feature 192 retracts. Further, with the engagement feature 192 in the retracted position, the first and second engagement members 284, 288 are also in the retracted position, so as to be disengaged from the elongate shaft 120. As the first carriage assembly 124 moves along the elongate shaft 120, it is contemplated that the first and second engagement members 284, 288 ride along the intermediate portion of the slider bracket 172 until they reach the second ramp portion 184 of the slider bracket 172, wherein the first and second engagement members 284, 288 begin their approach to the elongate shaft 120 for engagement therewith. Thus, in FIGS. 16A-16B, the elongate shaft 120 is spaced-apart from, or disengaged from, the receiving area 292 when the first and second engagement members 284, 288 are in the retracted position.

Figure 17A:
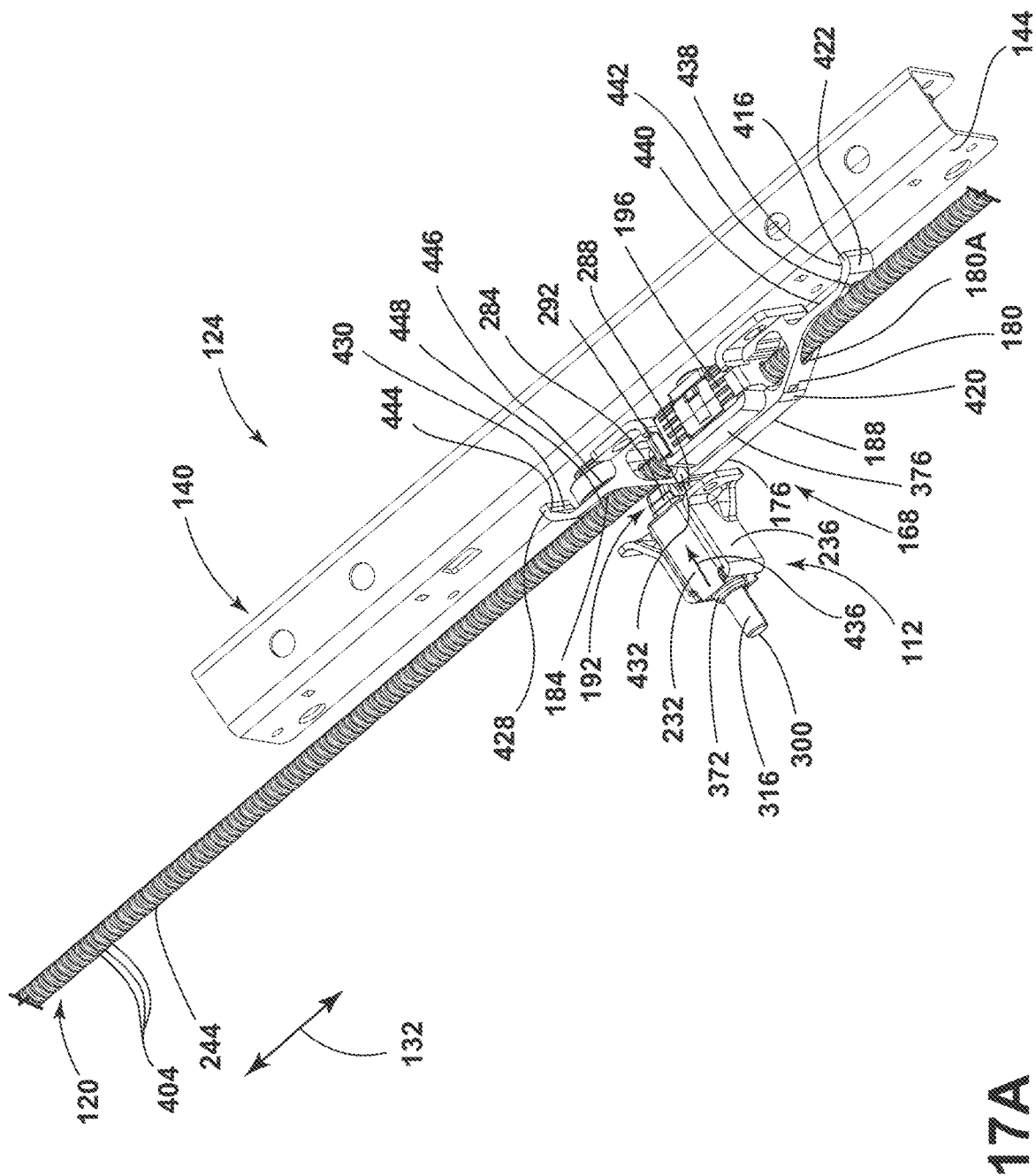
FIG. 17A is a top perspective view of the support assembly and the carriage assembly of FIG. 14A, with the engagement feature of the support assembly engaging the coupling assembly to partially retract the engagement feature.
Figure 17B:
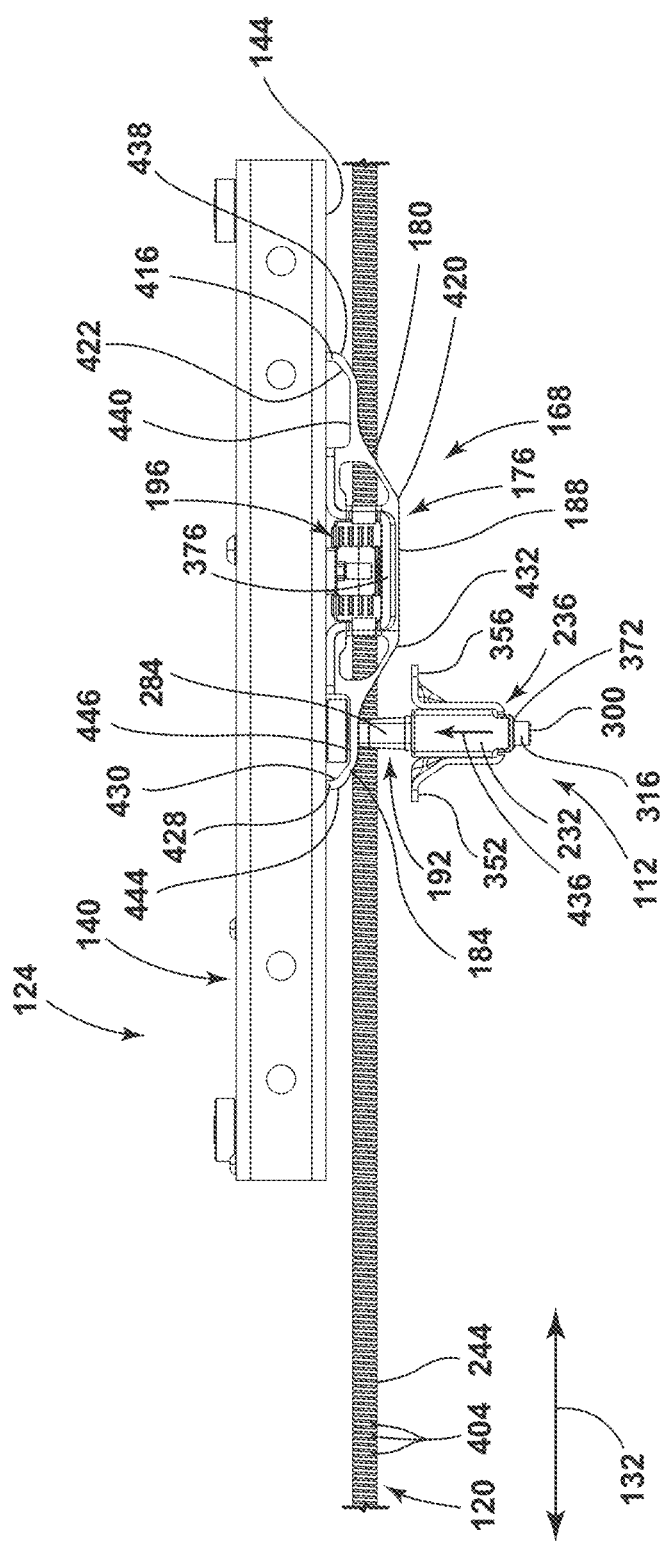
FIG. 17B is a top view of the support assembly and the carriage assembly of FIG. 17A with the engagement feature partially engaged with the elongate shaft.

Referring now to FIG. 17A-17B, the first carriage assembly 124 has further moved from the left to the right along the elongate shaft 120 relative to FIGS. 14A-16B. As such, the engagement feature 192 of the support assembly 112 has reached and passed a second end 432 of the second ramp portion 184. As shown in FIGS. 17A and 17B, the second ramp portion 184 of the slider bracket 172 includes a first end 428 and a second end 432. In various examples, the first end 428 can include a curved portion 430 that is positioned between the elongate shaft 120 and the body portion 140 of the carriage assembly 48. The first end 428 is shown disposed on the first side of the elongate shaft 120 similar to the first end 416 of the first ramp portion 180. The second end 432 of the second ramp portion 184 is shown disposed on the second side of the elongate shaft 120, similar to the second end 420 of the first ramp portion 180. Thus, the second ramp portion 184 acts as a re-introductory ramp for the engagement feature 192 of the support assembly 112 to reintroduce the engagement feature 192 to engagement with the elongate shaft 120. Thus, as the first carriage assembly 124 moves further along the elongate shaft 120 in a left to right direction, the first and second engagement member 284, 288 will move towards the deployed position, as biased by the biasing member 240 thereof, to reengage the elongate shaft 120. Referring now to FIG. 17B, the engagement feature 192 is shown partially engaged with the elongate shaft 120. Thus, as the engagement feature 192 moves to the deployed position along the path as indicated by arrow 436, the engagement feature 192 stays in contact with the angled surface of the second ramp portion 184 as the first carriage assembly 124 moves from left to right along the elongate shaft 120. In various examples, the first ramp portion 180 can include a leading edge 438. The leading edge 438 can include the curved portion 422 that is positioned between the elongate shaft 120 and the body portion 140 of the carriage assembly 48. The first ramp portion 180 can include a first planar portion 440 that is positioned proximate to the leading edge 438. For example, the first planar portion 440 can be positioned between the receiving aperture 180A of the first ramp portion 180 and the leading edge 438. The first planar portion 440 can define a shaft-receiving slot 442 that provides a support surface to the elongate shaft 120. For example, the shaft-receiving slot 442 can support a portion of the elongate shaft 120 as the support assembly 112 is actuated to the retracted position by the slider bracket 172. The shaft-receiving slot 442 can extend from the receiving aperture 180A of the first ramp portion 180 along the first planar portion 440 while maintaining a portion of the slider bracket 172 between the elongate shaft 120 and the body portion 140 of the carriage assembly 48 in the region of the first planar portion 440. Similarly, in various examples, the second ramp portion 184 can include a trailing edge 444. The trailing edge 444 can include the curved portion 430 that is positioned between the elongate shaft 120 and the body portion 140 of the carriage assembly 48. The second ramp portion 184 can include a second planar portion 446 that is positioned proximate to the trailing edge 444. For example, the second planar portion 446 can be positioned between the receiving aperture 184A of the second ramp portion 184 and the trailing edge 444. The second planar portion 446 can define a shaft-receiving slot 448 that provides a support surface to the elongate shaft 120. For example, the shaft-receiving slot 448 can support a portion of the elongate shaft 120 as the support assembly 112 is actuated to the extended or deployed position by the slider bracket 172. The shaft-receiving slot 448 can extend from the receiving aperture 184A of the second ramp portion 184 along the second planar portion 446 while maintaining a portion of the slider bracket 172 between the elongate shaft 120 and the body portion 140 of the carriage assembly 48 in the region of the second planar portion 446.

Figure 18A:
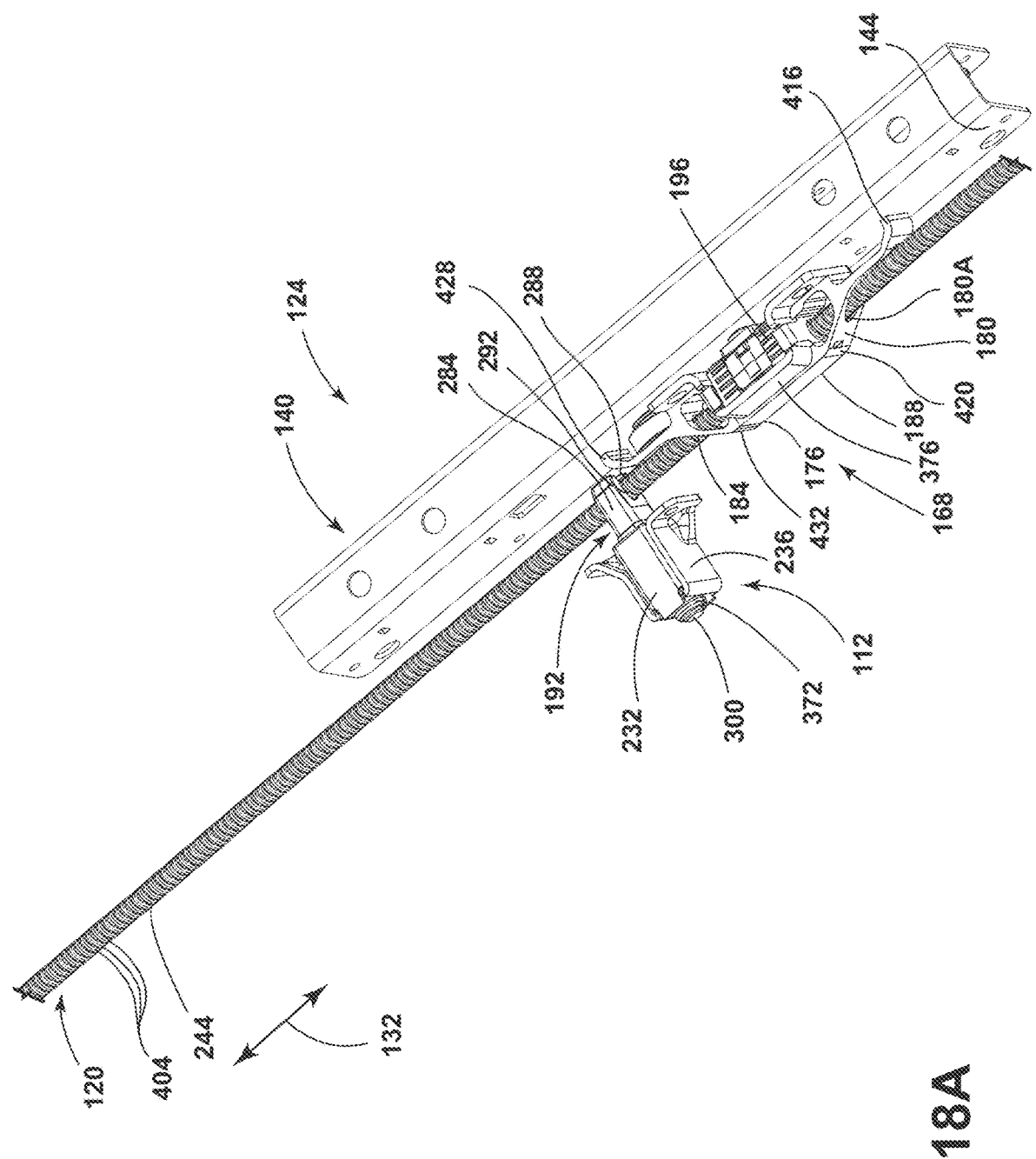
FIG. 18A is a top perspective view of the support assembly and the carriage assembly of FIG. 14A, with the engagement feature of the support assembly in the deployed position to reengage the elongate shaft.

Referring now to FIGS. 18A and 18B, the first carriage assembly 124 is shown having moved past the support assembly 112 along the elongate shaft 120, such that the first and second engagement members 284, 288 are fully engaged with the elongate shaft 120. With the engagement feature 192 in the fully deployed position, the elongate shaft 120 is again received in the receiving area 292. In this way, the support assembly provides an engagement feature 192 that is selectively engaged with the elongate shaft 120 to support the elongate shaft 120 in positions both above and below the elongate shaft 120 via the first and second engagement members 284, 288. Should the first carriage assembly 124 now move from the right to left direction along the elongate shaft 120, the second ramp portion 184 will act as the first introductory ramp of the slider bracket 172 to move the engagement feature 192 from the deployed position to the retracted position. Thus, the first and second ramp portions 180, 184 contact and guide the first and second engagement members 284, 288 from the deployed position to the retracted position, as well as from the retracted position to the deployed position as the carriage assembly 124 is driven past the support assembly 112 along the elongate shaft 120. In this way, the support assemblies 112 of the present concept provide selective support for the elongate shaft 120 as the carriage assemblies 124, 128 move along the elongate shaft 120. It is contemplated that the support assemblies 112 are spaced apart along the elongate shaft 120, such that the elongate shaft 120 is consistently supported by a number of the support assemblies that are not immediately aligned with a coupling assembly 168 of a carriage assembly, such as carriage assemblies 124, 128.

Referring now to FIGS. 19 and 20, examples of the mounting bracket 224 are shown at opposing ends of the track assembly 44 (first end 76 and second end 80). The mounting brackets 224 are mounted or otherwise fastened or secured to the inner surface 256 of the first sidewall 96. In various examples, the mounting brackets 224 can be provided with apertures 456 that are defined by at least a portion of the mounting bracket 224. The apertures 456 of the mounting brackets 224 may receive a fastener that secures the mounting bracket 224 to the inner surface 256 of the first sidewall 96. Alternatively, the mounting bracket 224 may be welded to the inner surface 256 of the first sidewall 96. One of the mounting brackets 224 may be provided with shaft engagement portions 460 that directly engage with the elongate shaft 120. The shaft engagement portions 460 of the mounting bracket 224 may be generally parallel to one another and define a space therebetween that receives the elongate shaft 120. For example, the shaft engagement portions 460 of the mounting bracket 224 may directly engage with upper and lower notches 228, 230 of the elongate shaft 120 that are positioned proximate to the first end 222A of the elongate shaft 120. Accordingly, the mounting bracket 224 that is positioned at or near the first end 76 of the track assembly 44 can prevent the elongate shaft 120 from rotating about an axis defined by a center point of the elongate shaft 120. The mounting bracket 224 positioned at the second end 80 of the track assembly 44 can define a shaft-receiving aperture 464 that receives the elongate shaft 120 at the second end 222B of the elongate shaft 120. The mounting bracket 224 positioned at the second end 80 of the track assembly 44 can be provided with a support flange 468 that may further define the shaft-receiving aperture 464. The elongate shaft 120 may be suspended between the first and second ends 76, 80 of the track assembly 44 by the mounting brackets 224. In such an example, the support assemblies 112 may provide intermediate support to the elongate shaft 120 along a length of the elongate shaft 120 between the mounting brackets 224 that are positioned at the first and second ends 76, 80 of the track assembly 44. The mounting brackets 224 and the support assemblies 112 may provide structures through which external loads applied to the elongate shaft 120 may be transferred from the elongate shaft 120 to the track assembly 44, thereby mitigating or preventing damage to the elongate shaft 120 as a result of the externally applied forces. The externally applied forces experienced by the elongate shaft 120 may include, but are not limited to, gravity, rail-mounted component forces, and/or impact forces. The externally applied forces experienced by the elongate shaft 120 can be transferred from the elongate shaft 120 to the engagement feature 192. The transferred external force experienced by the engagement feature 192 can be in turn transferred to the support bracket 236 and the track assembly 44.

Figure 21B:
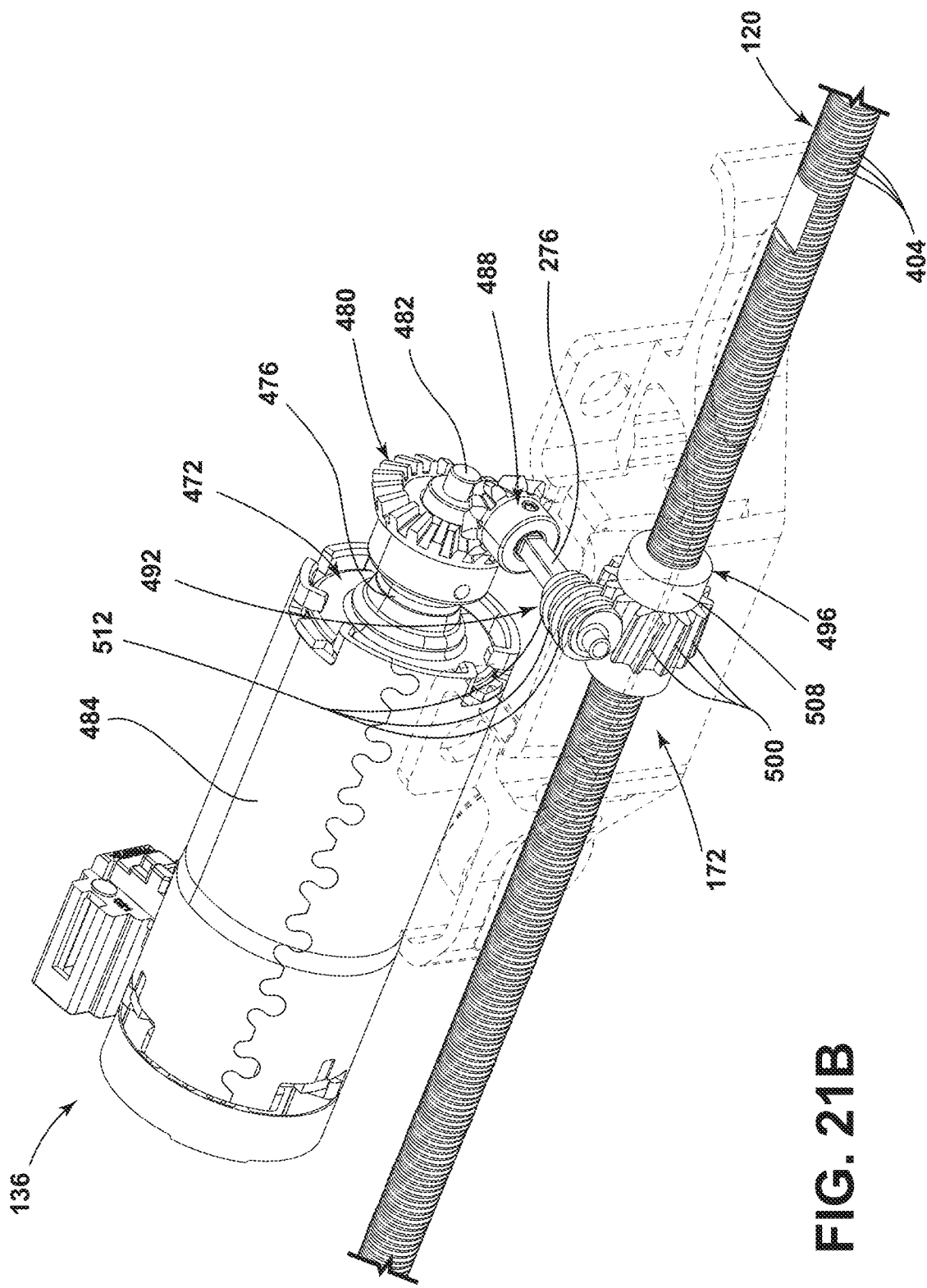
FIG. 21B is a side perspective view of the actuator and the gear box, illustrating an interaction between various components of the actuator and the gear box, according to one example.

Referring to FIGS. 21A-21B, the actuator 136 is shown with components that extend to the gearbox 196, as well as the components of the gearbox 196. The gearbox 196 is positioned within the slider bracket 172. The elongate shaft 120 extends through the gearbox 196. The actuator 136, the gearbox 196, and the components thereof may be referred to as a drive assembly. The actuator 136 of the drive assembly can include a motor 472, a motor driveshaft 476 that extends from the motor 472, and a motor drive gear 480 that is positioned at an end 482 of the motor driveshaft 476 that is opposite the motor 472. The motor 472, the motor driveshaft 476, and the motor drive gear 480 can be positioned within an actuator housing 484 that protects the internal components of the actuator 136 from intrusion of foreign objects, such as debris. In various examples, a transmission gear 488 may be provided as part of the drive assembly. The transmission gear 488 can engage with the motor drive gear 480 such that rotational motion of the motor drive gear 480 is translated into rotational motion of the transmission gear 488. The transmission gear 488 may extend at an angle relative to the motor drive gear 480. For example, the transmission gear 488 can extend at a nonparallel angle relative to the motor drive gear 480. In the depicted example, the transmission gear 488 engages with the motor drive gear 480 at a generally perpendicular angle. The transmission gear 488 may be coupled to a nut drive gear 492 by way of the driveshaft 276. The driveshaft 276 that couples the transmission gear 488 to the nut drive gear 492 can extend through a sidewall of the actuator housing 484 to transmit rotational motion of the motor 472 of the actuator 136 to a component that is external to the actuator 136. The component that is external to the actuator 136 and receives the rotational motion of the motor 472 of the actuator 136 is a shaft nut 496. The nut drive gear 492 may directly receive the rotational motion of the motor 472 of the actuator 136 by way of the motor drive gear 480 and the transmission gear 488. The shaft nut 496 may indirectly receive the rotational motion provided by the motor 472 of the actuator 136 by way of the coupling provided between the nut drive gear 492 and the shaft nut 496. In various examples, the gearbox 196 includes the shaft nut 496 and the nut drive gear 492. The gearbox 196 may be provided as a housing that generally protects the engagement between the nut drive gear 492, the shaft nut 496, and the elongate shaft 120 from intrusion of debris or otherwise external or foreign objects that may negatively impact the ability of the actuator 136 to drive the carriage assembly 48 along the elongate shaft 120. The shaft nut 496 can include gear teeth 500 that are positioned about an outer circumference of the shaft nut 496. In various examples, the gear teeth 500 of the shaft nut 496 can extend from an exterior surface 508 of the shaft nut 496. The nut drive gear 492 can include teeth 512 that define valleys therebetween. Accordingly, the teeth 512 of the nut drive gear 492 may extend to engage with the gear teeth 512 of the shaft nut 496. Therefore, the engagement between the teeth 512 of the nut drive gear 492 and the gear teeth 500 of the shaft nut 496 can cooperate to transmit motion from the nut drive gear 492 to the shaft nut 496. Rotational motion imparted to the motor drive gear 480 by the motor 472 of the actuator 136 is transmitted to the nut drive gear 492 by way of the transmission gear 488 and the driveshaft 276, The nut drive gear 492 can then transmit the rotational motion imparted by the motor 472 from the nut drive gear 492 to the shaft nut 496 by way of the engagement between the teeth 512 of the nut drive gear 492 and the gear teeth 500 of the shaft nut 496. In the depicted example, the nut drive gear 492 may be referred to as a worm gear. The shaft nut 496 can include thread teeth 516 positioned about an interior circumference of the shaft nut 496. The elongate shaft 120 can include the threads 404 that extend from an exterior surface of the elongate shaft 120. The thread teeth 516 positioned about the interior circumference of the shaft nut 496 can engage with the threads 404 of the elongate shaft 120 such that rotational motion imparted to the shaft nut 496 by the nut drive gear 492 can result in actuation of the shaft nut 496, and ultimately the carriage assembly 48, along a length of the elongate shaft 120.

Figure 22:
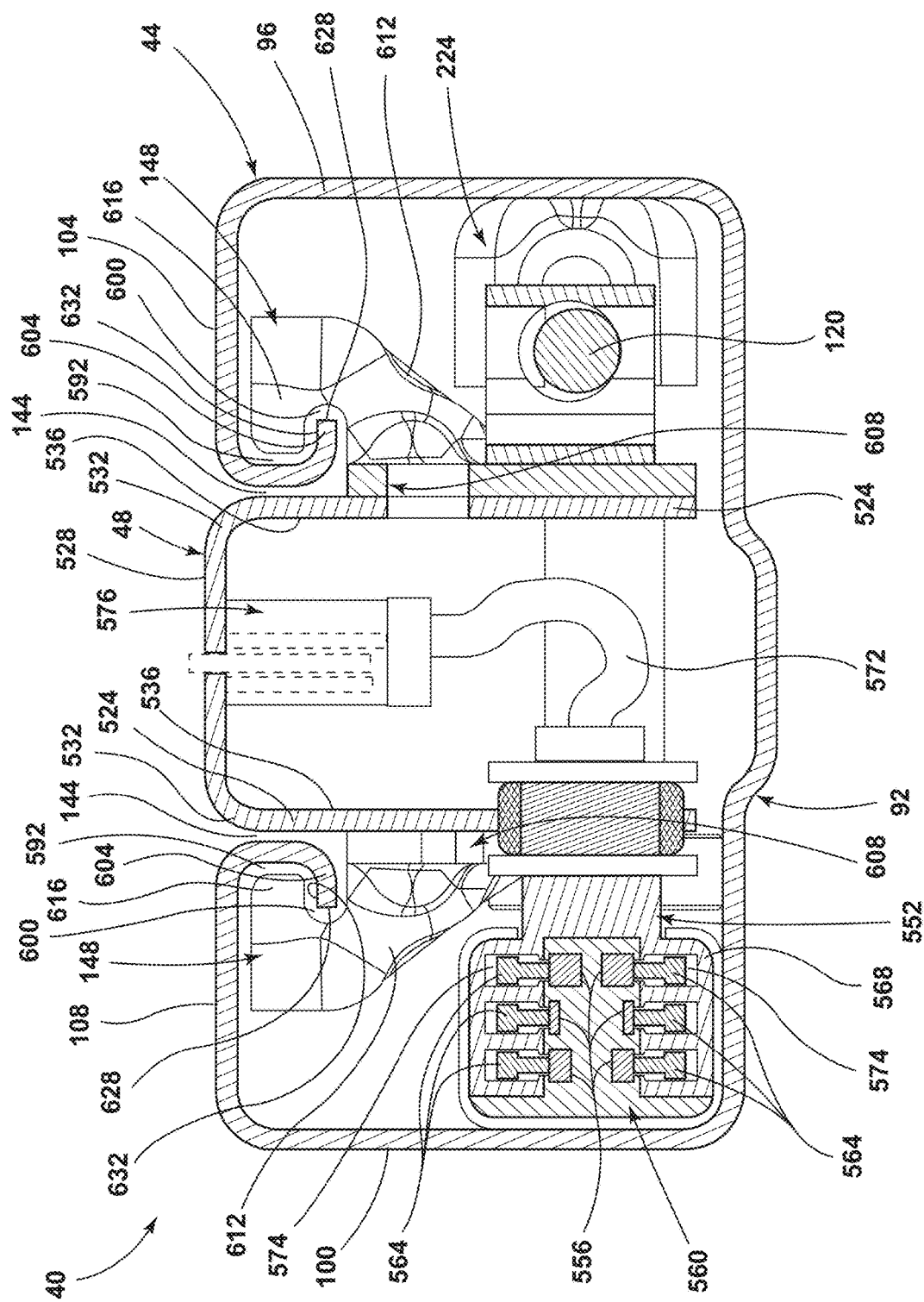
FIG. 22 is a cross-sectional view of the rail assembly, taken at line XXII-XXII of FIG. 3, illustrating an interaction of various components of the carriage assembly and the track assembly, according to one example.
Figure 23:
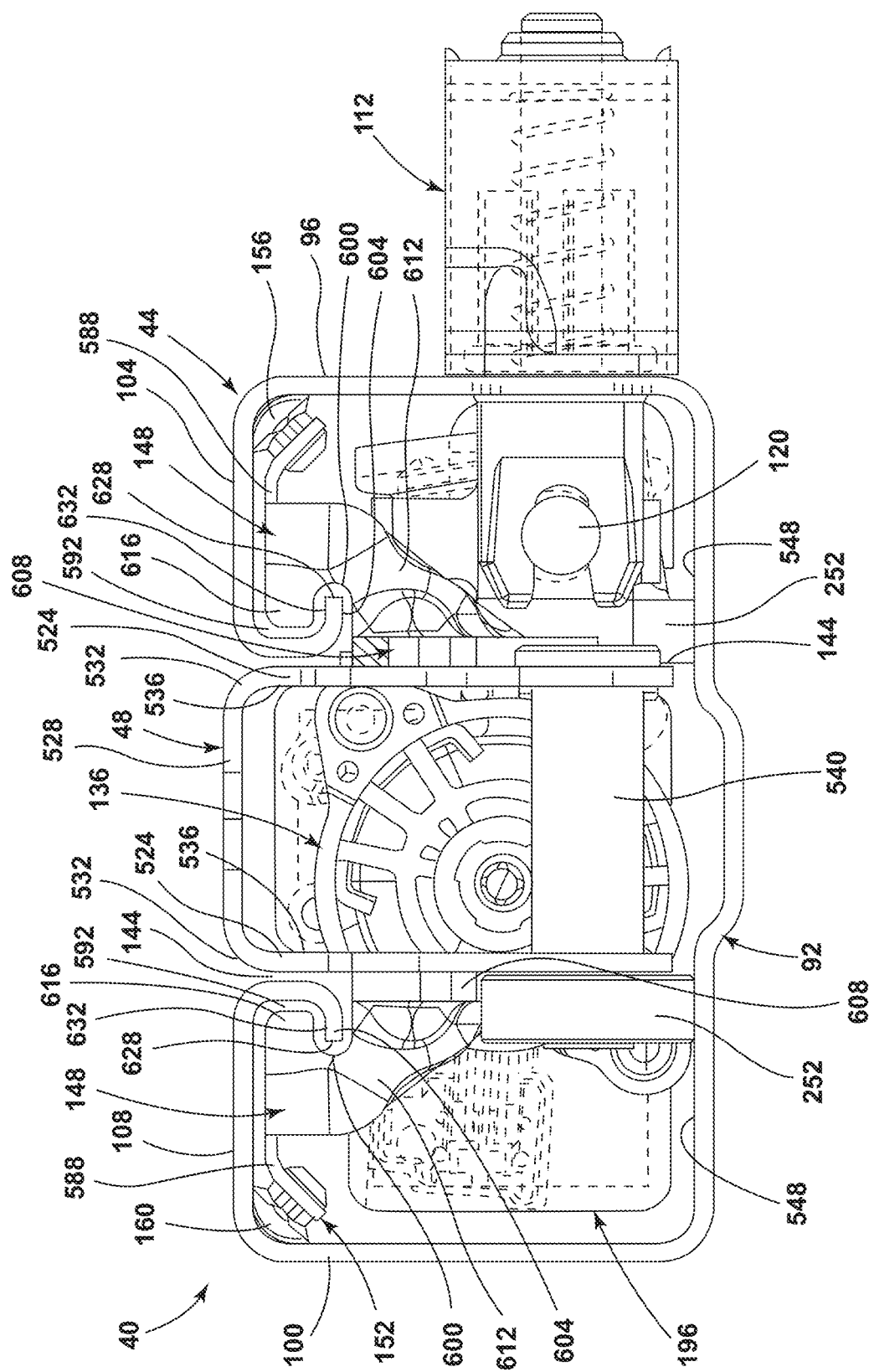
FIG. 23 is a cross-sectional view of the rail assembly, taken at line XXIII-XXIII of FIG. 3, illustrating the interaction of various components of the carriage assembly and the track assembly, according to one example.
Figure 24:
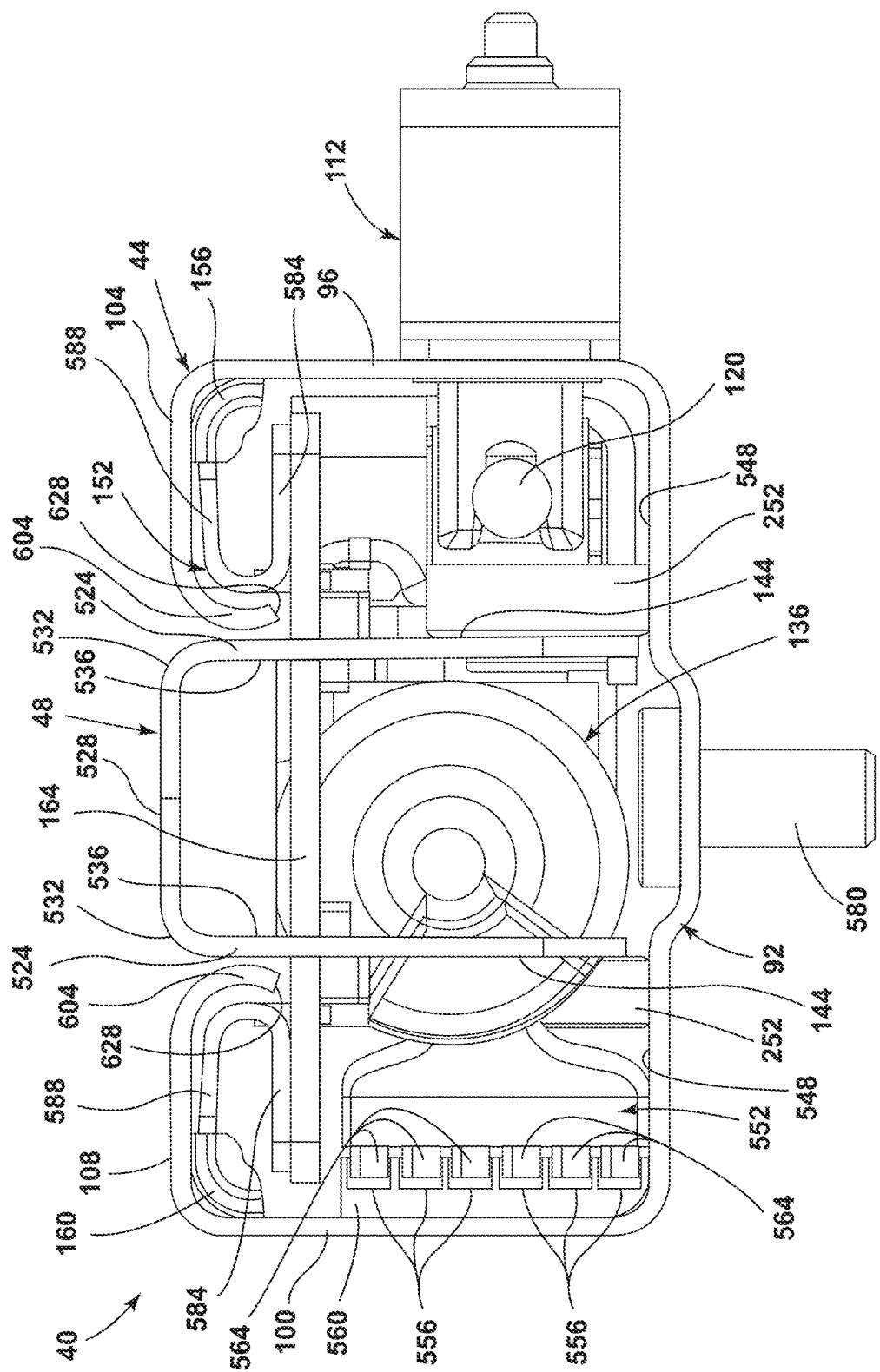
FIG. 24 is a cross-sectional view of the rail assembly, taken at line XXIII-XXIII of FIG. 3, illustrating the interaction of various components of the carriage assembly and the track assembly, according to one example.

Referring to FIGS. 22-24, the rail assembly 40 is shown at various cross-sections along a length of the track assembly 44 to show the interaction of various components of the carriage assembly 48 with the various components of the track assembly 44. The track assembly 44 includes the first and second upper walls 104, 108. The carriage assembly 48 includes sidewalls 524 that are interconnected by an upper wall 528 of the carriage assembly 48. The carriage assembly 48 may include transition corners 532 between the sidewalls 524 and the upper wall 528. The transition corners 532 may be rounded. For example, the transition corners 532 of the carriage assembly 48 may be defined by radiused corners. An internal space, such as interior portion 280, may be defined by the sidewalk 524 of the carriage assembly 48. Said another way, interior surfaces 536 of the sidewalls 524 of the carriage assembly 48 may define a space or void. The space or void defined by the sidewalk 524 of the carriage assembly 48 may receive the actuator 136. In various examples, a roller pin 540 may extend between, and/or through, the sidewalk 524 of the carriage assembly 48. The roller pin 540 may secure one or more of the rollers 252 to the carriage assembly. The rollers 252 that are secured to the carriage assembly 48 can engage with an upper surface 548 of the bottom wall 92 such that the vertical forces applied to the carriage assembly 48 may be transferred to the track assembly 44 by way of the rollers 252. The rollers 252 can decrease a coefficient of friction associated with actuation of the carriage assembly 48 relative to the track assembly 44.

Referring again to FIGS. 22-24, the carriage assembly 48 can include a brush assembly 552 that extends from the carriage assembly 48 to engage with conduits 556 provided on the track assembly 44. The conduits 556 that are coupled to the track assembly 44 can be contained within a conduit housing 560. The brush assembly 552 can include brushes 564 that extend from the brush assembly 552 to engage with the conduits 556. In various examples, the brushes 564 of the brush assembly 552 may be biased towards an extended or engaged position with the conduits 556. For example, the brushes 564 of the brush assembly 552 can be provided with a biasing member that is positioned between a rearward or interior surface 574 of the brush 564 and a brush housing 568 of the brush assembly 552. In some examples, the conduits 556 that are coupled to the track assembly 44 can transmit and/or receive data signals and/or power signals between the rail-mounted component that is coupled to the carriage assembly 48 and the vehicle. The brush assembly 552 can be coupled to, or include, a receptacle conduit 572 that extends from the brushes 564 to a receptacle 576 that is positioned on or within the carriage assembly 48. For example, the receptacle conduit 572 may be one or more wires, a conduit ribbon, or other suitable connection that extends from the brushes 564 to the receptacle 576 such that power signals and/or data signals that are transmitted or received between the conduits 556 on the track assembly 44 and the rail-mounted component that is coupled to the carriage assembly 48. The receptacle 576 may be a plug that is engaged by a corresponding and complementary plug on the rail-mounted component as will be discussed in more detail herein. In the depicted example, the receptacle 576 is positioned within an aperture that is defined by the upper wall 528 of the carriage assembly 48 and extends between the sidewalls 524 of the carriage assembly 48 to engage with the receptacle conduit 572. In various examples, the track assembly 44 can be provided with a recess or trench in the bottom wall 92 that receives one or more fasteners 580 that are utilized to couple the track assembly 44 to a support member, such as a frame of the vehicle. The recess or trench provided in the bottom wall 92 of the track assembly 44 can provide an offset for the fasteners 580 to be received within while preventing the fastener 580 from intruding into an interior space of the track assembly 44 in a manner that may impede actuation of the carriage assembly 48.

Referring further to FIGS. 22-24, the guide assembly 152 can include the first guide member 156 and the second guide member 160. The first and second guide members 156, 160 may be coupled to a common spacer member 164 that may extend through the sidewalls 524 of the carriage assembly 48. Alternatively, the first and second guide members 156, 160 may be mounted or otherwise fastened to the exterior surface 144 of the sidewalk 524 of the carriage assembly 48. In either example, the guide assembly 152 can include a mounting bracket 584, the resilient portion 588, and the guide member, such as the first guide member 156 of the second guide member 160. The resilient portion 588 of the guide assembly 152 can extend from the mounting bracket 584 toward the guide member 156, 160. The guide member 156, 160 can be positioned at an end of the resilient portion 588 that is opposite the mounting bracket 584. In various examples, the retaining bracket 148 can be mounted to the exterior surface 144 of the sidewalk 524 of the carriage assembly 48 in a manner that defines a cavity 592 between the retaining bracket and the exterior surface 144. (See FIGS. 4-5 and 10-11). In various examples, the retaining bracket 148 is fastened to the exterior surface 144 of the sidewalk 524 of the carriage assembly 48. While described as being fastened to the exterior surface 144 of the sidewalls 524 of the carriage assembly 48, it is contemplated that the retaining bracket 148 may directly abut the exterior surface 144 while the fastener utilized to secure the retaining bracket 148 to the carriage assembly 48 may pass through the sidewall 524 of the carriage assembly 48. For example, the fastener utilized to secure the retaining bracket 148 to the sidewalk 524 of the carriage assembly 48 may be a threaded fastener, such as a bolt. Accordingly, the fastener for the retaining bracket 148 may pass through a fastener aperture 596 (see FIG. 4) defined by the retaining bracket 148 to engage with a corresponding fastener aperture on the sidewall 524 of the carriage assembly 48. In such an example, the fastener apertures in the sidewalls 524 of the carriage assembly 48 may be provided with complementary and/or corresponding threads that engage with threads on the threaded fastener. In some examples, the entirety of the retaining bracket 148 may be external to the carriage assembly 48. That is, the retaining bracket 148 may be separately formed from the carriage assembly 48 and coupled to the sidewall 524 on the carriage assembly 48 during assembly. Regardless of how the retaining bracket 148 is secured to the carriage assembly 48, including any examples where the retaining bracket 148 is integrally or unitarily formed with the carriage assembly 48, the retaining bracket 148 can extend outwardly from a point at which the retaining bracket 148 is fastened to the exterior surface 144 of the sidewalls 524 of the carriage assembly 48. The retaining bracket 148 may also extend upwardly from the point at which the retaining bracket 148 is fastened to the sidewalk 524 of the carriage assembly 48. In various examples, the retaining bracket 148 can define a notch 600 that receives a retaining lip 604 of the track assembly 44.

Referring further to FIGS. 22-24, the retaining bracket 148 can include the mounting flange 608, which may be fastened to the exterior surface 144 of the sidewall 524 of the carriage assembly 48. In various examples, the mounting flange 608 of the retaining bracket 148 can be parallel to the exterior surface 144 of the body portion 140 of the carriage assembly 48. The mounting flanges 608 may directly abut the exterior surface 144 of the body portion 140 of the carriage assembly 48. For example, the mounting flange 608 of the retaining bracket 148 can directly abut the exterior surface 144 of the sidewall 524 of the body portion 140 of the carriage assembly 48. In some examples, the retaining bracket 148 can include a body portion 612 that extends outwardly from the mounting flange 608 and the exterior surface 144 of the body portion 140 of the carriage assembly 48. Examples of the retaining bracket 148 may include retention arms 616 that extend inwardly toward the mounting flanges 608 from the body portion 140 of the retaining bracket 148. The inward extension of the retention arms 616 relative to the body portion 612 of the retaining bracket 148 may define the notch 600 that receives the retaining lip 604 of the track assembly 44. The retention arms 616 may be positioned at opposing ends of the body portion 612 of the retaining bracket 148. For example, the retention arms 616 may be positioned at a first end 620 and a second end 624 of the body portion 612 of the retaining bracket 148. The retaining lip 604 of the track assembly 44 can be positioned along a horizontal plane of the track assembly 44. Said another way, in examples where the track assembly 44 is mounted to a floor of the vehicle, the retaining lip 604 of the track assembly 44 can be parallel, generally parallel, or substantially parallel to a surface of the floor of the vehicle such that the retaining lip 604 extends along a horizontal plane of the track assembly 44. In various examples, the retaining lip 604 may be a turned-over edge that doubles back or turns inwardly toward one of the sidewalls 96, 100 to which the retaining lip 604 is most immediately adjacent. The body portion 612 of the retaining bracket 148 can be laterally offset from a terminal end 628 of the retaining lip 604 in the horizontal plane. The retention arms 616 of the retaining bracket 148 can extend over an upper surface 632 of the retaining lip 604 in a vertical plane. The vertical plane and the horizontal plane of the track assembly 44 can be perpendicular to one another. It is contemplated that the track assembly 44 may be mounted to various surfaces or structures within the vehicle such that the horizontal plane and the vertical plane may not be perfectly horizontal or vertical, respectively, relative to a surface upon which the vehicle is traveling or relative. Accordingly, the reference to a horizontal plane of the track assembly 44 is intended to refer to a plane that is parallel to the first and second upper walls 104, 108 that extends between the first and second sidewalls 96, 100. Similarly, the reference to a vertical plane of the track assembly 44 is intended to refer to a plane that is generally perpendicular to the previously articulated horizontal plane and that extends in a direction that is parallel to the first and second sidewalls 96, 100.

Referring still further to FIGS. 22-24, in some examples, the extension of the retention arms 616 over the upper surface 632 of the retaining lip 604 in the vertical plane can occur solely at the opposing ends (e.g., first end 428 and second end 432) of the retaining bracket 148 that are provided with the retention arms 616. In such examples, a cross-sectional overlap in the vertical plane of the retaining bracket 148 and the retaining lip 604 may be limited by a thickness of the retaining bracket 148 at the retention arms 616 in the horizontal plane at the first and second ends 428, 432 of the retaining bracket 148. The cavity 592 between the retaining bracket 148 and the exterior surface 144 can be defined by the exterior surface 144 of the sidewall 524, an interior surface of the body portion 612 of the retaining bracket 148, and interior surfaces of the retention arms 616. The guide assembly 152 can be received within the cavity 592 defined by the retaining bracket 148 and the exterior surface 144 of the sidewall 524. Similar to the retaining bracket 148, the guide assembly 152 can be mounted or otherwise fastened to the exterior surface 144 of the sidewall 524 of the carriage assembly 48, Similar to the retaining bracket 148, the guide assembly 152 can be mounted to the sidewall 524 by way of one or more fasteners in a manner similar to that of the fasteners utilized to mount the retaining bracket 148. Accordingly, the fasteners for the guide assembly 152 may extend through the sidewall 524 of the carriage assembly 48 to which the guide assembly 152 is mounted. In various examples, the retaining bracket 148 can include a recess 636 that is defined by an upper surface 640 of the body portion 612 of the retaining bracket 148 (see FIGS. 4-5). in such examples, the resilient portion 588 of the guide assembly 152 can extend over the recess 636 to position the guide member 156, 160 outward of an exterior surface of the retaining bracket 148.

Referring now to FIGS. 25A-26B, the guide assembly 152 is shown according to various examples. The guide assembly 152 includes the guide members, such as the first guide member 156 and the second guide member 160. The guide member 156, 160 can be positioned at an end of the resilient portion 588 of the guide assembly 152 that is opposite the mounting bracket 584. In general, the mounting bracket 584 of the guide assembly 152 can provide a fixed support that the resilient portion 588 is movable relative to. Said another way, the end of the resilient portion 588 that is coupled to the mounting bracket 584 may he generally fixed or stationary relative to the mounting bracket 584 when the mounting bracket 584 is mounted to a support structure, such as the sidewall 524 of the carriage assembly 48. The end of the resilient portion 588 that is provided with the guide member 156, 160 may be referred to as a free end of the resilient portion 580. With the mounting bracket 584 of the guide assembly 152 fastened or otherwise mounted to the sidewall 524 of the carriage assembly 48 (e.g., mounted to the exterior surface 144 of the sidewall 524), the free end of the resilient portion 588 that is provided with the guide member 156, 160 can move relative to the mounting bracket 584. For example, when the mounting bracket 584 is secured to the carriage assembly 48, the free end of the resilient portion 588 that is provided with the guide member 156, 160 can be movable in the vertical plane as the guide member 156, 160 interacts with the track assembly 44. In use, the guide members 156, 160 engage with the inner surfaces of the upper walls 104, 108 of the track assembly 44 as the carriage assembly 48 moves along the length of the track assembly 44. In various examples, the guide members 156, 160 can engage with an upper corner of the track assembly 44 that is positioned between the sidewall 96, 100 of the track assembly 44 and the upper walls 104, 108 of the track assembly 44. The guide members 156, 160 can be positioned within the track assembly 44 such that the guide member 156, 160 engages with at least a portion of the sidewalls 96, 100, at least a portion of the upper walls 104, 108, and the corner of the track assembly 44 positioned between the sidewalls 96, 100 and the upper walls 104, 108.

Figure 25A:
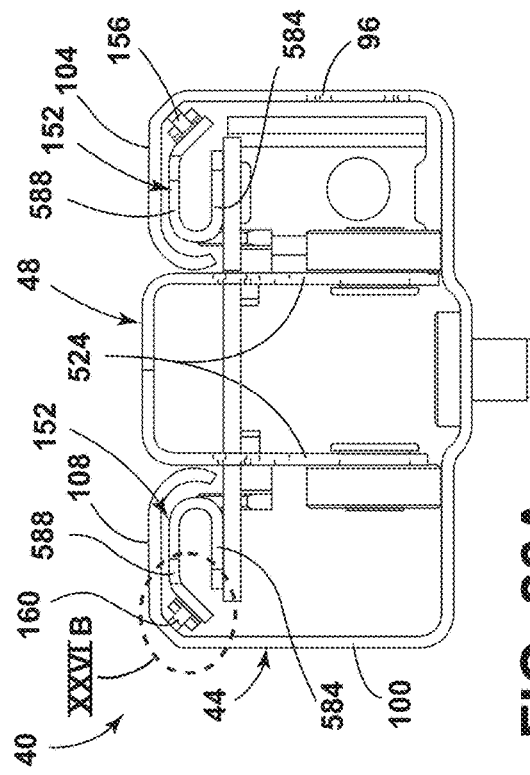
FIG. 25A is a cross-sectional view of the rail assembly, taken at line XXIII-XXIII of FIG. 3, illustrating the interaction of various components of the carriage assembly and the track assembly, according to one example.
Figure 25B:
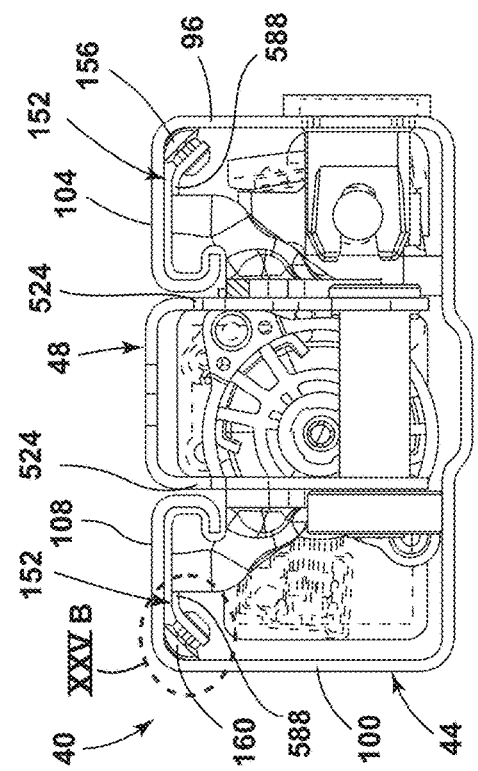
FIG. 25B is an expanded view, taken at region XXVB of FIG. 25A, illustrating a guide assembly of the carriage assembly, according to one example.

Referring again to FIGS. 25A-26B, in some examples, such as those depicted in FIGS. 25A-25B, the guide members 156, 160 may be solid structures that are made of a material that has a low coefficient of friction with the material that the track assembly 44 is constructed of The guide members 156, 160 may be provided as generally oblong in shape. The guide members 156, 160 may have a rounded profile in a width direction and/or a length direction. For example, as shown in FIGS. 25A-25B, the guide members 156, 160 have a generally arcuate or rounded shape in the width direction and the length direction. The rounded or arcuate shape of the exterior surface of the guide members 156, 160 that engages with the inner surface of the track assembly 44 directly can be clearly seen in FIG. 25A. The rounded or arcuate shape of the guide members 156, 160 in the length direction may be best seen in FIG. 25B. The rounded or arcuate shape provided in the length direction of the guide member 156, 160 is indicated by the concentric lines depicted outward of a center point of the guide member 156, 160 in the length direction. The concentric lines denoting the arcuate or rounded shape of the guide member 156, 160 are positioned between a central region 644 of the guide member 160 and end regions 648 of the guide member 160. In some examples, the end regions 648 of the guide members 156, 160 may be tapered such that a portion of the end region 648 that is proximate to the central region 644 has a thickness in the width and/or length direction that is greater than the thickness in the width and/or length direction of the end region 648 that is distal to the central region. The rounded or arcuate shape provided in the various cross-sectional directions of the guide members 156, 160, as well as the tapering at the end regions 648, can aid in preventing the guide members 156, 160, and ultimately the carriage assembly 48, from becoming hung up or otherwise impeded in their motion relative to the track assembly 44 as a result of debris, damage, or imperfections that may occur during operation of the rail assembly 40.

Figure 26A:
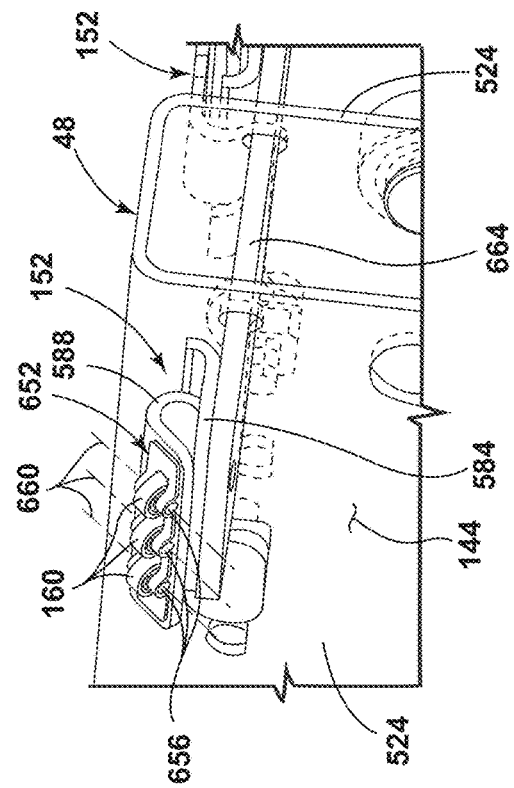
FIG. 26A is a cross-sectional view of the rail assembly, taken at line XXIII-XXIII of FIG. 3, illustrating the interaction of various components of the carriage assembly and the track assembly, according to one example.
Figure 26B:
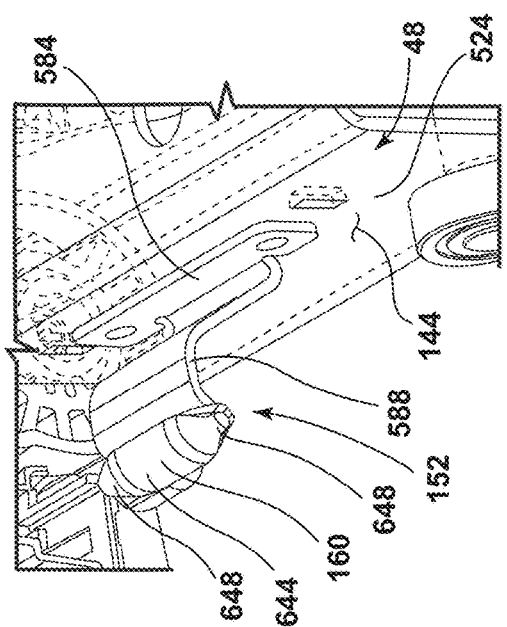
FIG. 26B is an expanded view, taken at region XXVIB of FIG. 26A, illustrating the guide assembly of the carriage assembly, according to another example.

Referring further to FIGS. 25A-26B, in some examples, such as those depicted in FIGS. 26A-26B, the guide members 156, 160 may be rollers that are coupled to the resilient portion 588 of the guide assembly 152 by a roller bracket 652. The coupling of the roller bracket 652 to the resilient portion 588 of the guide assembly 152 can define pin apertures that receive pins 656 upon which the rollers are mounted such that the rollers are retained to the guide assembly 152. The pins 656 can define a rotational axis 660 about which the associated roller rotates as the carriage assembly 48 is actuated along the track assembly 44. In examples that employ the rollers as the guide members 156, 160, the corner of the track assembly 44 that is positioned between the sidewalls 96, 100 and the upper walls 104, 108 may be provided as a more planar or flat corner than the examples that do not employ the rollers as the guide members 156, 160. The more planar or flattened corner between the sidewalls 96, 100 and the upper walls 104, 108 can provide better contact between the track assembly 44 and the rollers and/or may provide a greater surface area with which the rollers can engage during operation. Regardless of the construction, the guide assemblies 152 and the guide members 156, 160 can prevent chucking, binding, or general misalignment of the carriage assembly 48 relative to the track assembly 44 during operation. Accordingly, the guide assemblies 152 can aid in taking up slack or clearances that may be provided between movable components such that rattling, humming, and/or buzzing of the rail assembly 40 is prevented or diminished. In some examples, the guide assemblies 152 that are positioned at one of the ends of the carriage assembly 48 may be coupled to one another by way of a support structure 664 that extends through the sidewalls 524 of the carriage assembly 48. The resilient portions 588 of the guide assemblies 152 can provide a spring or biasing force that biases the guide members 156, 160 to an extended position and aids in maintaining continuous contact between the guide members 156, 160 and the inner surface of the track assembly 44 during operation. When the carriage assembly 48 is coupled to the track assembly 44, the guide assemblies 152 may be placed in an at least partially compressed state such that the carriage assembly 48 can be inserted into the track assembly 44. Once the carriage assembly 48 has been coupled to the track assembly 44, the guide assemblies 152 may be released from their at least partially compressed position and allowed to directly engage with the track assembly 44.

Figure 28:
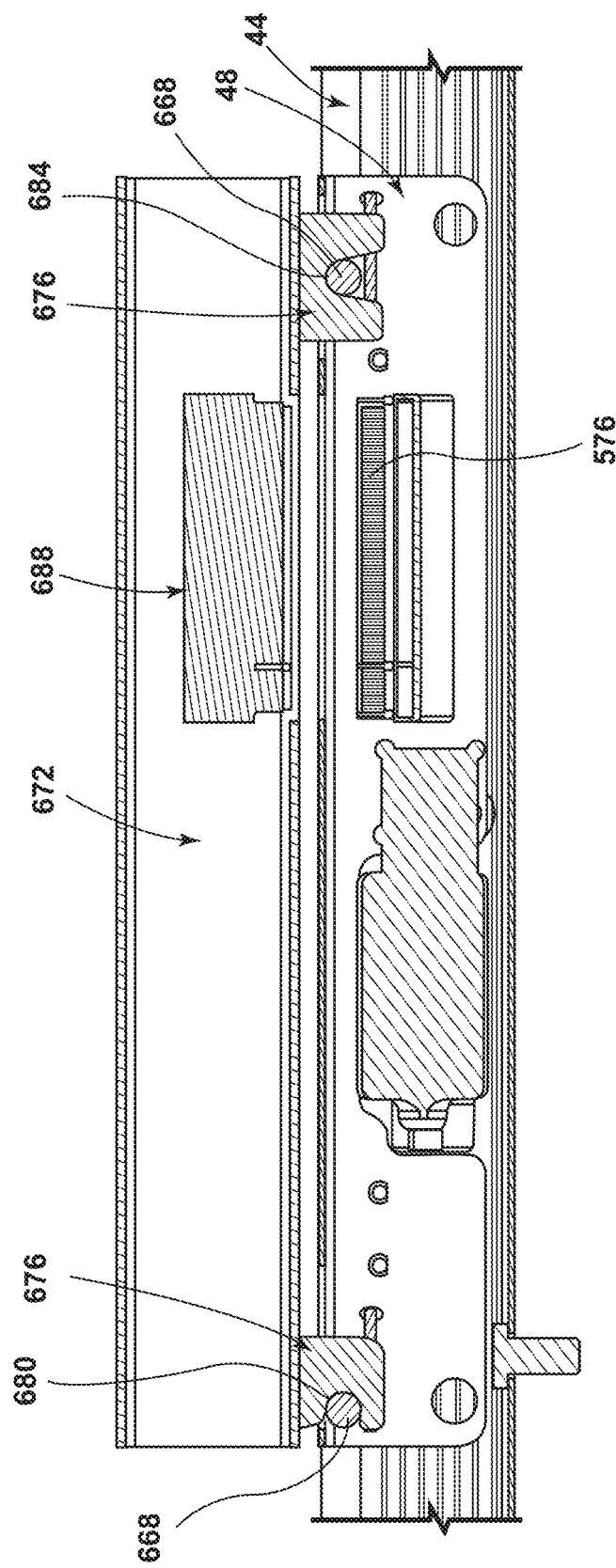
FIG. 28 is a cross-sectional view of the rail assembly and the component mounting assembly, taken at line XXVII-XXVII of FIG. 1, illustrating a coupling of the component mounting assembly to the carriage assembly, according to one example.
Figure 29:
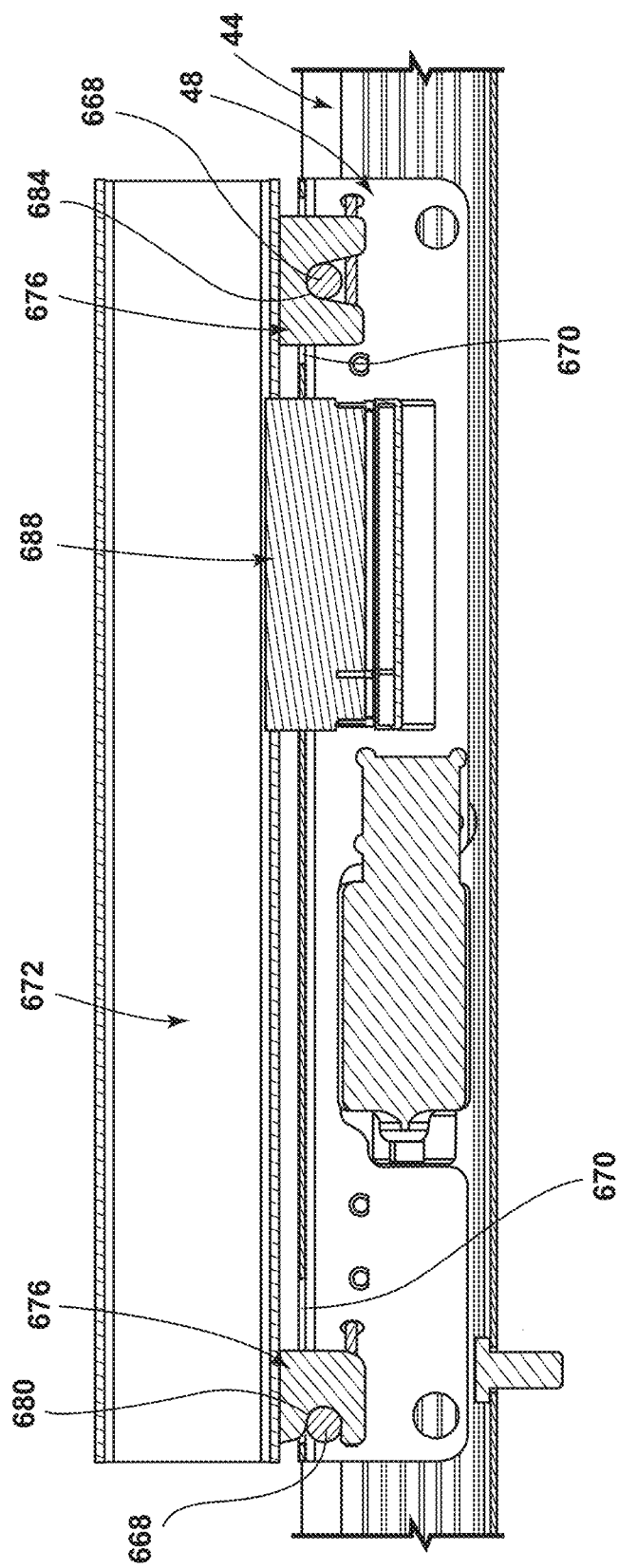
FIG. 29 is a cross-sectional view of the rail assembly and the component mounting assembly, taken at line XXVII- XXVII of FIG. 1, illustrating an engagement between a transfer plug of the component mounting assembly and a receptacle of the carriage assembly, according to one example.
Figure 30:
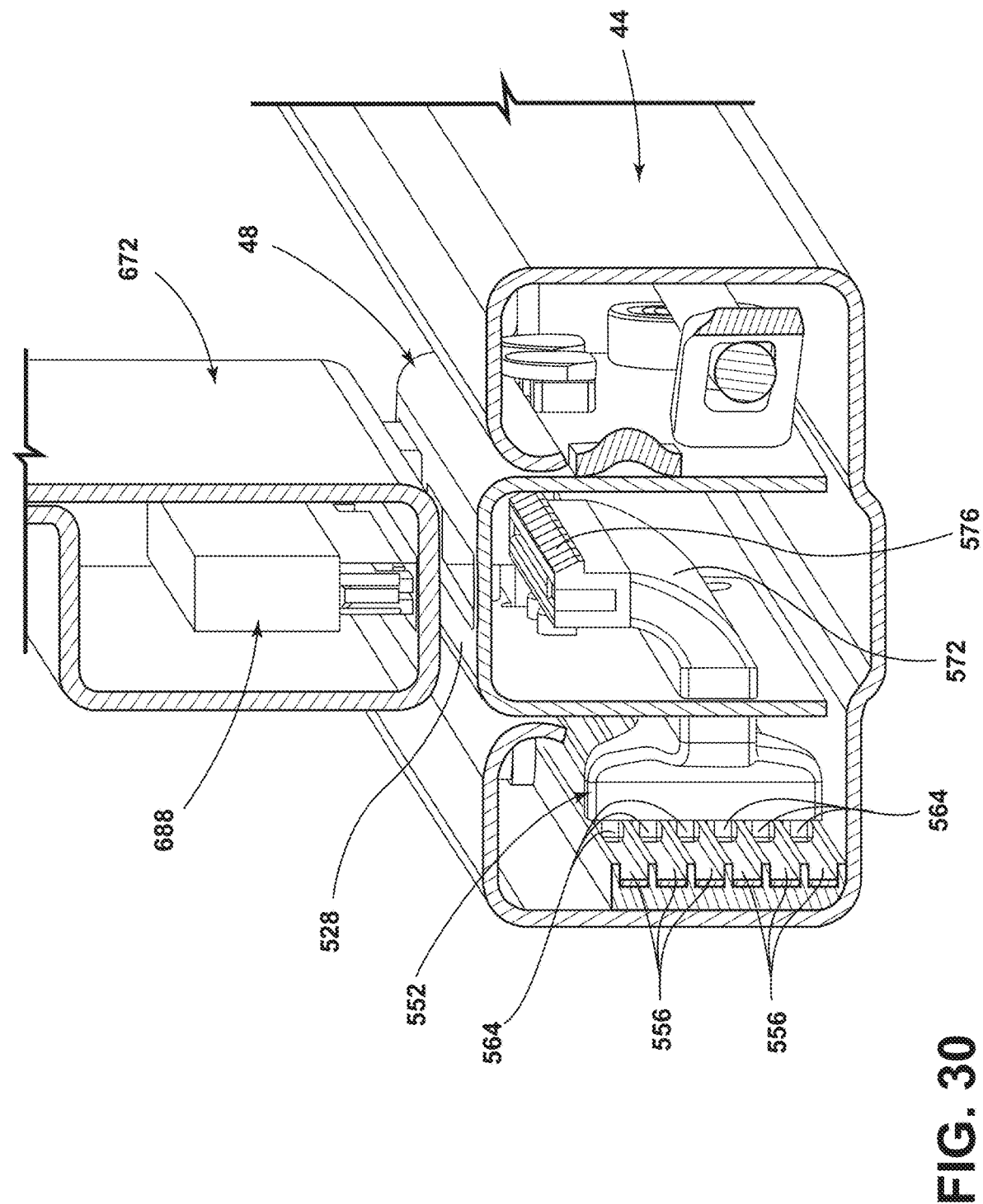
FIG. 30 is a cross-sectional view of the rail assembly and the component mounting assembly, taken at line XXX-XXX of FIG. 1, illustrating the transfer plug in a retracted position within the component mounting assembly, according to one example.

Referring to FIGS. 27-31 the carriage assembly 48 can be provided with one or more striker bars 668 in an upper region thereof. The striker bars 668 can be accessible by way of apertures 670 provided in the upper wall 528 of the carriage assembly 48 (see FIG. 6). The striker bars 668 of the carriage assembly 48 can be utilized to couple a component mounting assembly 672 of the rail-mounted component (e.g., the seating assembly 52) to the carriage assembly 48. For example, the component mounting assembly 672 can be provided with engagement portions 676 that interact with the striker bars 668 to facilitate a coupling of the component mounting assembly 672 to the carriage assembly 48. In various examples, the component mounting assembly 672 may be coupled to the carriage assembly 48 in a drop-in manner as depicted in FIGS. 27-29. In such an example, one of the engagement portions 676 of the component mounting assembly 672 may be provided with a lateral notch 680, such as the engagement portion on the left side of FIGS. 27-29, that engages with one of the striker bars 668 of the carriage assembly 48 in a manner that aids in retention of the component mounting assembly 672 and ultimately the rail-mounted component to the carriage assembly 48 in a vertical direction. When the engagement portion 676 having the lateral notch 680 is engaged with the corresponding striker bar 668, the component mounting assembly 672 may be pivoted about an axis defined by the striker bar 668 to which the lateral notch 680 is coupled in a direction toward the remaining striker bar 668 of the carriage assembly 48.

Figure 31:
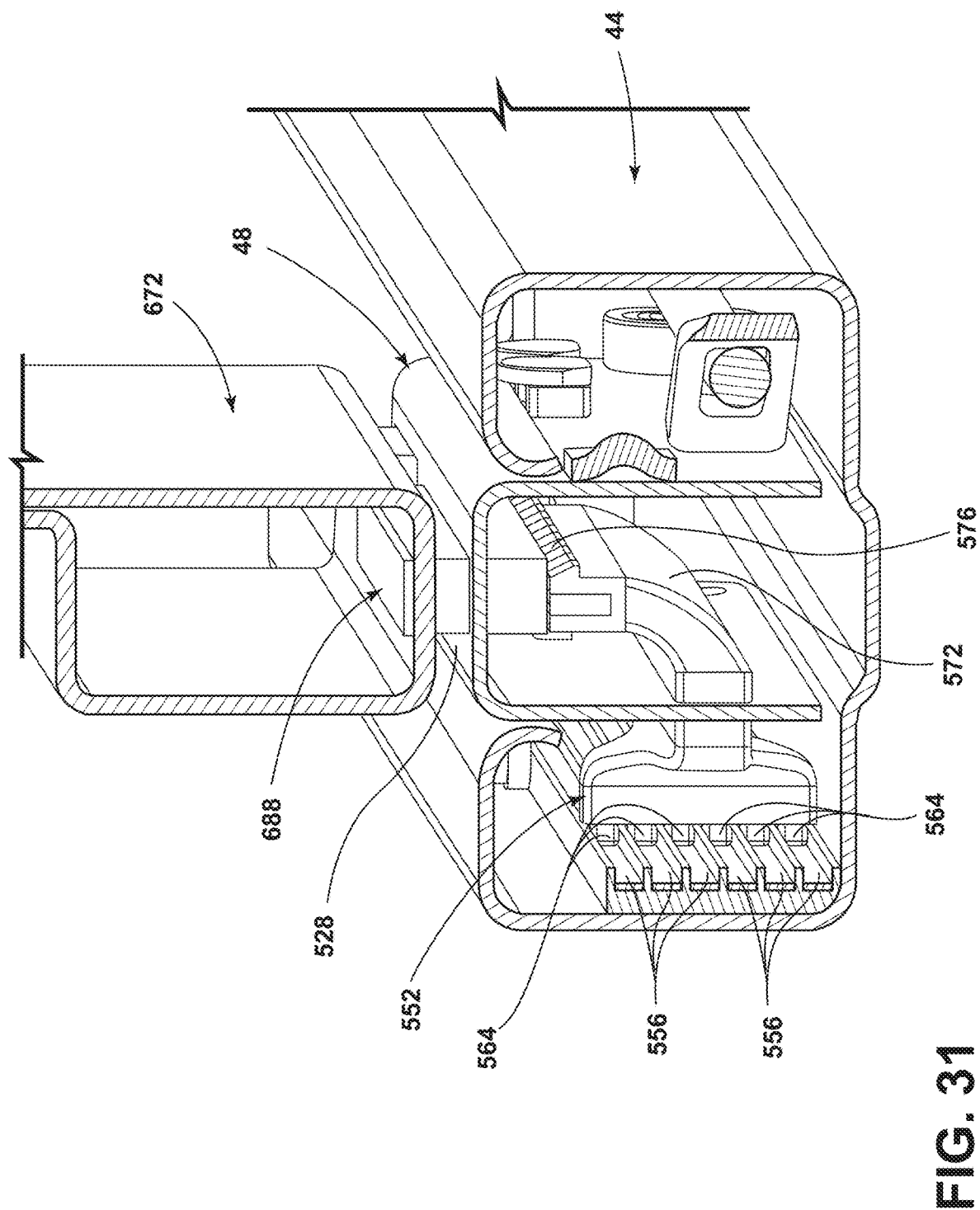
FIG. 31 is a cross-sectional view of the rail assembly and the component mounting assembly, taken at line XXX-XXX of FIG. 1, illustrating the transfer plug in an extended position within the component mounting assembly, according to one example.

Referring again to FIGS. 27-31, the engagement portion 676 that couples to the remaining striker bar 668 can be provided with a vertical notch 684 that contacts the remaining striker bar 668 upon rotation of the component mounting assembly 672 toward the carriage assembly 48 until physical contact is established between the engagement portion 676 and the striker bar 668 and/or the component mounting assembly 672 and the carriage assembly 48. The vertical notch 684 of the engagement portion 676 can aid in retention of the component mounting assembly 672 and ultimately the rail-mounted component to the carriage assembly 48 in a lateral or horizontal direction. The vertical notch 684 may also aid in maintaining engagement between the lateral notch 680 and the striker bar 668 associated with the lateral notch 680. Accordingly, coupling and decoupling of the component mounting assembly 672 and the carriage assembly 48 may be accomplished with a combination of vertical, horizontal, and/or rotational motion of the component mounting assembly 672 relative to the carriage assembly 48. The component mounting assembly 672 can include a transfer plug 688 that is extendable relative to the component mounting assembly 672. Upon coupling of the component mounting assembly 672 to the carriage assembly 48, the transfer plug 688 may be actuated from a retracted position (FIGS. 27 and 30) to an extended position (FIGS. 29 and 31). The transfer plug is positioned and configured to engage with the receptacle 576 of the carriage assembly 48 such that power signals and/or data signals can be transferred from the track assembly 44 by way of the conduits 556 into the brushes 564 of the brush assembly 552, transferred along the receptacle conduits 572, and ultimately to the rail-mounted component to which the component mounting assembly 672 is associated. Thus, a communication path is established between the track assembly 44, the carriage assembly 48, and the rail-mounted component by way of the component mounting assembly 672. The communication pathway established can be utilized to transfer power signals and/or data signals to and from the track assembly 44, the carriage assembly 48, and the rail-mounted component. Some of the conduits 556 of the track assembly 44 may be dedicated to the transfer and/or receipt of power signals while other of the conduits 556 on the track assembly 44 may be dedicated to the transfer and/or receipt of data signals.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A rail assembly, comprising:
    a track assembly comprising a retaining lip; and
    a carriage assembly received within the track assembly, wherein the carriage assembly comprises:
        a body portion;
        an exterior surface of the body portion; and
        a retaining bracket fastened to the exterior surface, the retaining bracket extending outwardly from the point at Which the retaining bracket is fastened to the exterior surface, and the retaining bracket defining a notch that receives the retaining lip of the track assembly.

2. The rail assembly of claim 1, wherein the retaining bracket comprises:
    a mounting flange that is fastened to the exterior surface of the body portion of the carriage assembly.

3. The rail assembly of claim 2, wherein the mounting flange of the retaining bracket is parallel to the exterior surface of the body portion of the carriage assembly, and wherein the mounting flange directly abuts the exterior surface of the body portion of the carriage assembly.

4. The rail assembly of claim 2, wherein the retaining bracket further comprises:
    a body portion that extends outwardly from the mounting flange and the exterior surface of the body portion of the carriage assembly.

5. The rail assembly of claim 4, wherein the retaining bracket further comprises:
    retention arms that extend inwardly toward the mounting flange from the body portion of the retaining bracket.

6. The rail assembly of claim 5, wherein the retention arms are positioned at opposing ends of the body portion of the retaining bracket.

7. The rail assembly of claim 5, wherein the inward extension of the retention arms relative to the body portion of the retaining bracket defines the notch that receives the retaining lip of the track assembly.

8. The rail assembly of claim 7, wherein the retention lip of the track assembly is positioned along a horizontal plane of the track assembly.

9. The rail assembly of claim 8, wherein the body portion of the retaining bracket is laterally offset from a terminal end of the retention lip in the horizontal plane.

10. The rail assembly of claim 9, wherein the retention arms of the retaining bracket extend over an upper surface of the retention lip in a vertical plane.

11. The rail assembly of claim 10, wherein the extension of the retention arms over the upper surface of the retention lip in the vertical plane occurs solely at the opposing ends of the retaining bracket that are provided with the retention arms.

12. The rail assembly of claim 1, wherein the outward extension of the retaining bracket from the exterior surface of the carriage assembly defines a cavity between the retaining bracket and the exterior surface.

13. The rail assembly of claim 12, further comprising:
a guide assembly received within the cavity between the retaining bracket and the exterior surface, wherein the guide assembly is mounted to the exterior surface of the carriage assembly.

14. The rail assembly of claim 13, wherein the guide assembly comprises:
a mounting bracket;
a resilient portion extending from the mounting bracket; and
a guide member positioned at an end of the resilient portion that is opposite the mounting bracket.

15. The rail assembly of claim 14, wherein the retaining bracket further comprises:
a recess defined by an upper surface of the body portion of the retaining bracket, wherein the resilient portion of the guide assembly extends over the recess to position the guide member outward of an exterior surface of the retaining bracket.

16. A rail assembly, comprising:
a track assembly comprising a retaining lip; and
a carriage assembly received within the track assembly, wherein the carriage assembly comprises:
a body portion;
an exterior surface of the body portion; and
a retaining bracket, the retaining bracket comprising:
a first end;
a second end;
a mounting flange that is fastened to the exterior surface of the body portion of the carriage assembly;
a body portion that extends outwardly from the mounting flange and the exterior surface of the body portion of the carriage assembly; and
retention arms that extend inwardly toward the mounting flange from the body portion of the retaining bracket at the first end and the second end of the retaining bracket, and wherein the inward extension of the retention arms relative to the body portion of the retaining bracket defines a notch that receives the retaining lip of the track assembly.

17. The rail assembly of claim 16, wherein the retention lip of the track assembly is positioned along a horizontal plane of the track assembly, and wherein the body portion of the retaining bracket is laterally offset from a terminal end of the retention lip in the horizontal plane.

18. The rail assembly of claim 17, wherein the retention arms of the retaining bracket extend over an upper surface of the retention lip in a vertical plane, and wherein the extension of the retention arms over the upper surface of the retention lip in the vertical plane occurs solely at the first and second ends of the retaining bracket that are provided with the retention arms.

19. The rail assembly of claim 16, wherein the outward extension of the body portion of the retaining bracket from the mounting flange of the retaining bracket defines a cavity between the retaining bracket and the exterior surface of the carriage assembly to which the retaining bracket is fastened, wherein a guide assembly is received within the cavity between the retaining bracket and the exterior surface, and wherein the guide assembly is mounted to the exterior surface of the carriage assembly.

20. The rail assembly of claim 19, wherein the retaining bracket further comprises a recess defined by an upper surface of the body portion of the retaining bracket, and wherein the guide assembly comprises:
a mounting bracket;
a resilient portion extending from the mounting bracket, wherein the resilient portion extends over the recess of the retaining bracket to position the guide member outward of an exterior surface of the retaining bracket; and
a guide member positioned at an end of the resilient portion that is opposite the mounting bracket.

* * * * *